United States Patent
Kobayashi et al.

(10) Patent No.: US 6,310,669 B1
(45) Date of Patent: Oct. 30, 2001

(54) TFT SUBSTRATE HAVING CONNECTING LINE CONNECT TO BUS LINES THROUGH DIFFERENT CONTACT HOLES

(75) Inventors: Kazuhiro Kobayashi, Tokyo; Nobuhiro Nakamura; Yukio Endoh, both of Kumamoto, all of (JP)

(73) Assignees: Mitsubishi Denki Kabushiki Kaisha, Tokyo; Advanced Display Inc, Kikuchi-gun, both of (JP)

(*) Notice: Subject to any disclaimer, the term of this patent is extended or adjusted under 35 U.S.C. 154(b) by 0 days.

(21) Appl. No.: 09/081,935

(22) Filed: May 21, 1998

(30) Foreign Application Priority Data

May 26, 1997 (JP) .................................................. 9/135057
Dec. 22, 1997 (JP) .................................................. 9/352920

(51) Int. Cl.⁷ .......................... G02F 1/136; G02F 1/1343; H01L 31/036
(52) U.S. Cl. .............................. 349/43; 349/38; 349/139; 257/59
(58) Field of Search .......................... 349/42, 43, 139, 349/187, 38; 257/59, 72

(56) References Cited

U.S. PATENT DOCUMENTS 5,182,661 * 1/1993 Ikeda et al. ............................. 349/38
5,668,019   9/1997 Kobayashi et al. ................... 438/163
5,986,738 * 11/1999 Tagusa et al. ......................... 349/138

FOREIGN PATENT DOCUMENTS

| 1-191829 | * | 1/1989 | (JP) . |
| 4-163528 |   | 6/1992 | (JP) . |
| 4-265945 |   | 9/1992 | (JP) . |
| 4-358128 | * | 11/1992 | (JP) . |
| 4-335617 |   | 11/1992 | (JP) . |
| 6-208137 |   | 7/1994 | (JP) . |
| 8-50308  |   | 2/1996 | (JP) . |
| 8-328041 |   | 12/1996 | (JP) . |

* cited by examiner

*Primary Examiner*—Toan Ton
(74) *Attorney, Agent, or Firm*—Oblon, Spivak, McClelland, Maier & Neustadt, P.C.

(57) ABSTRACT

A TFT array substrate including: an insulating substrate, a gate electrode, a gate electrode line, an insulating film, a semiconductor layer, a contact layer, a source electrode, a drain electrode, a source electrode line, an interlayer insulating film, a pixel electrode, and a connecting line which is made of a same material that of the pixel electrode and connects electrically between the gate electrode line and the source electrode line through a second contact hole provided in the insulating film and a third contact hole provided in the interlayer insulating film.

13 Claims, 22 Drawing Sheets

US 6,310,669 B1

TFT SUBSTRATE HAVING CONNECTING LINE CONNECT TO BUS LINES THROUGH DIFFERENT CONTACT HOLES

BACKGROUND OF THE INVENTION

The present invention relates to an active matrix liquid crystal display (hereinafter referred to as AMLCD) in which a thin film transistor (hereinafter referred to as TFT) array substrate in which TFTs are provided as switching elements is provided and to a method of manufacturing TFT array substrate for AMLCD.

FIG. 18 is a diagram of an equivalent circuit of the AMLCD, and FIG. 19 is a diagram of equivalent circuit of one pixel of the AMLCD.

In FIGS. 18 and 19, reference numeral 21 denotes a TFT, reference numeral 2 denotes a gate line (gate electrode line), reference numeral 9 denotes a source line (source electrode line), reference numeral 22 denotes a pixel capacitance provided by a liquid crystal material in the equivalent circuit (hereinafter reference numeral 22 denotes directly liquid crystal display), reference numeral 23 denotes a storage capacitance, reference numeral 4 denotes a common line for storage capacitance connected to the storage capacitance, reference numeral 24 denotes a connecting portion short-circuiting between a gate line 2 and a source line 9, reference numeral 25 denotes a source side drive circuit which is a drive circuit provided on source lines side, reference numeral 27 denotes a terminal for applying electric voltage to a common line 4.

FIG. 20 is a plan view showing one pixel in a TFT array substrate in which channel etch type TFT is provided. FIGS. 21(a) to 21(f) are sectional views showing a manufacturing step for a portion taken along an F—F line shown in FIG. 20. In FIG. 20 and FIGS. 21(a) to 21(f), a reference numeral 1 denotes an insulating substrate made of an insulating material (transparent material can also be employed) such as glass, a reference numeral 3 denotes a gate electrode made of a metal material such as chrome or the like connected to a gate line 2, a reference numeral 4 denotes a common line made of a metal material such as chrome or the like formed on the insulating substrate 1, reference numeral 5 denotes a gate insulating film formed in such a manner that the gate insulating film covers a gate line 2, a gate electrode 3 and a common line 4, reference numeral 6 denotes a semiconductor layer made of semiconductor material such as non-doped amorphous silicon or the like formed through a gate insulating film 5 on a gate electrode 3, reference numeral 7 denotes a contact layer which is formed on the semiconductor layer 6 and is made of a semiconductor film such as silicon or the like doped with impurities such as phosphorus (P) or the like. One portion of the contact layer corresponding to the upper portion of the active area is removed by etching, so that the contact layer includes an etched-off region 8, and is divided into two areas shown by references 7a and 7b depending upon the etched-off region 8. Reference numeral 14 denotes a pixel electrode made of a transparent conductive film such as indium tin oxide (ITO) or the like. The pixel electrode is used to apply a driving voltage upon liquid crystal material. Reference numeral 10 denotes a source electrode formed on a contact layer 7a and connected with source line 9, reference numeral 11 denotes a drain electrode formed on the contact layer 7b, reference numeral 28 denotes a contact hole formed for electrically connecting a gate line 2 with a source line 9, reference numeral 29 denotes a passivation film made of silicon nitride or the like, for covering the whole of outer surface of TFT array substrate.

Manufacturing steps are described below.

As shown in FIG. 21(a), one of chrome (Cr), aluminum (Al), molybdenum (Mo), molybdenum-tungsten (Mo—W) or the like is deposited on insulating substrate 1. Then the deposited film is patterned by using a resist (photoresist) formed through photolithography process, in order to form gate line 2, gate electrode 3 and common line 4. As shown in FIG. 21(b), there are continuously formed a gate insulating film 5 composed of silicon nitride or the like, a semiconductor film such as amorphous silicon by, for example, a plasma CVD method. Also, when TFT is n-type TFT, $n^+$-amorphous silicon or the like in which impurities such as phosphorus are doped in high concentration by, for example, a plasma CVD method. Then, the semiconductor layer and contact layer on the semiconductor layer are patterned in order to form a semiconductor layer 6 and contact layer 7 in island like pattern by using a resist formed by photolithography process, by either dry etching method or wet etching method. As shown in FIG. 21(c), a transparent conductive film composed of ITO or the like is deposited. Then the transparent conductive film is patterned by photolithography process, in order to form pixel electrodes 14.

As shown in FIG. 21(d), a contact hole is provided in gate insulating film 5 on the gate line 2 in order to obtain a connecting portion 24 for connecting gate line 2 with source line 9. As shown in FIG. 21(e), one of Cr, Al, Mo, Mo—W, or the like is deposited. Then the deposited film is patterned by using a resist formed through photolithography process as a mask, in order to form source line 9, source electrode 10 and drain electrode 11.

Then, an etched-off region a recess 8 of the contact layer 7 is provided in order to remove contact layer 7 from channel area, by etching the contact layer 7 by using source electrode 6 and drain electrode 7 as masks. As shown in FIG. 2(f), a silicon nitride film is deposited by using source electrode 6 and the drain electrode 7 as masks by a plasma CVD method in order to form passivation film 29. Portions of passivation film 29 on the terminals of gate lines 2 and on the terminals of source lines are removed by using resists formed by a photolithography process, in order to provide connection portion to external circuit. The above-mentioned steps require six photolithography processes to form a TFT array substrate in which channel etch type TFTs are provided.

The functions are described below.

An electric voltage is applied through gate line 2 to gate electrode 3 to let TFT 21 be on state. Then, an image signal is inputted to source line 9; an electric current flows through source electrode 10, semiconductor film 6 and drain electrode 11. TFT 21 comprises source electrode 10, semiconductor film 6 and drain electrode 13. An electric voltage corresponding to the desired image signal is applied through pixel electrode 14 connected with drain electrode 11 to the liquid crystal material 22. A storage capacitance 23 is connected in order to prevent from variation of an electric voltage applied to the liquid crystal material under the influence of storage capacitance 23, corresponding to switching operation of TFT 21. The storage capacitance 23 is provided by common line 4, gate insulating film 5 and pixel electrode 14.

As shown in FIG. 18, gate line 2 and source line 9 are connected electrically at connecting portion 24 at the end portion of the TFT array substrate. This connection of gate line 2 and source line 9 prevents from breakage of TFT by high voltage to gate insulating film 5 caused by static electricity generated in manufacturing steps of TFT array substrate and in rubbing alignment films.

Conventional AMLCD in which channel etch type TFTs are provided is constructed in the above-mentioned manner. Six photolithography processes are required to form TFT array substrate. Thus there arises a problem that the manufacturing cost is high and the throughput is lowered.

SUMMARY OF THE INVENTION

The present invention is achieved to solve the above-mentioned problem. The object of the invention is to reduce the number of photolithography processes, to reduce the manufacturing cost and to enhance the throughput in manufacturing steps for TFT array substrate of AMLCD.

According to the present invention there is provided TFT array substrate comprising:
   an insulating substrate,
   a gate electrode formed on the insulating substrate,
   a gate electrode line formed on the insulating substrate,
   an insulating film formed on the gate electrode, the gate electrode line and the insulating substrate except for whole of outer surface of the gate electrode and whole of outer surface of the gate electrode line,
   a semiconductor layer formed on the insulating film,
   a contact layer formed on the semiconductor layer,
   a source electrode connected to the contact layer,
   a drain electrode which is connected to the contact layer, the contact layer being divided into two portions, one of the two portions corresponding to the source electrode and the other one of the two portions corresponding to the drain electrode,
   a source electrode line connected to the source electrode,
   an interlayer insulating film formed on the gate electrode, the gate electrode line, the source electrode, the source electrode line and the drain electrode,
   a pixel electrode which is formed on the interlayer insulating film and is made of transparent conductive film and is connected electrically to the drain electrode through a first contact hole provided in the interlayer insulating film, and
   a connecting line which is made of a same material that of the pixel electrode and connects electrically between the gate electrode line and the source electrode line through a second contact hole provided in the insulating film and a third contact hole provided in the interlayer insulating film.

Preferably, the TFT array substrate further includes
   a common line for storage capacitance which is formed through the gate insulating film under the storage capacitance electrode at a same time when the gate electrode and the gate electrode line are formed, and
   a storage capacitance electrode which is formed over the common line for storage capacitance, and is formed at a same time when the source electrode, the source electrode line and the gate electrode line are formed, and is connected electrically to the pixel electrode through a contact hole formed in the interlayer insulating film, so that the TFT array substrate includes a storage capacitance between the common line for storage capacitance and the storage capacitance electrode.

Preferably, the TFT array substrate further includes a common line for storage capacitance formed at a same time when the gate electrode and the gate electrode line are formed, so that the TFT array substrate includes a storage capacitance between the common line for storage capacitance and the pixel electrode.

Preferably, the storage capacitance is provided by the storage capacitance electrode and the gate electrode line.

Preferably, the storage capacitance is provided by the gate electrode and the pixel electrode.

Preferably, the interlayer insulating film comprises a thick film.

Preferably, the interlayer insulating film comprises a multi-layer film including a high density film as a lower layer of the multi-layer film.

Preferably, the high density film is composed of silicon nitride.

Preferably, the pixel electrode superposes on at least one of the gate electrode line and the source electrode line.

Preferably, an etching stopper is provided on said semiconductor layer.

According to the present invention there is provided a method of manufacturing a TFT array substrate comprising
   an insulating substrate,
   a gate electrode formed on the insulating substrate,
   a gate electrode line formed on the insulating substrate,
   an insulating film formed on the gate electrode, the gate electrode line and the insulating substrate except for whole of outer surface of the gate electrode and whole of outer surface of the gate electrode line,
   a semiconductor layer formed on the insulating film,
   a contact layer formed on the semiconductor layer,
   a source electrode connected to the contact layer,
   a drain electrode which is connected to the contact layer, the contact layer being divided into two portions, one of the two portions corresponding to the source electrode and the other one of the two portions corresponding to the drain electrode,
   a source electrode line connected to the source electrode,
   an interlayer insulating film formed on the gate electrode, the gate electrode line, the source electrode, the source electrode line and the drain electrode,
   a pixel electrode which is formed on the interlayer insulating film and is made of transparent conductive film and is connected electrically to the drain electrode through a first contact hole provided in the interlayer insulating film, and
   a connecting line which is made of a same material that of the pixel electrode and connects electrically between the gate electrode line and the source electrode line through a second contact hole provided in the insulating film and a third contact hole provided in the semiconductor layer on the source electrode, the insulating film and the interlayer insulating film,
   the method comprising steps of:
      (a) forming the gate electrode and the gate electrode line on the insulating substrate,
      (b) depositing the insulating film on the gate electrode, the gate electrode line and the insulating substrate except for whole of outer surface of the gate electrode and whole of outer surface of the gate electrode line,
      (c) forming the semiconductor layer over the gate electrode through the insulating film and forming the contact layer on the semiconductor layer,
      (d) forming the source electrode and the drain electrode on the contact layer, and forming the source electrode line and etching the contact layer by using the source electrode and the drain electrode as masks,
      (e) depositing the interlayer insulating film on the source electrode, the source electrode line and the drain electrode, (f) providing simultaneously two of the first contact hole in the insulating film on the gate electrode and in the interlayer insulating film, the second contact hole in the interlayer insulating film on the source electrode line, and the third contact hole in the interlayer insulating film on the drain electrode, and (g) forming simultaneously the pixel electrode and the connecting line.

Preferably, at least one contact hole of the first contact hole, the second contact hole and the third contact hole, in multi-layer film including at least the interlayer insulating film as a top layer of the multi-layer film is provided by steps of:

(a) providing the one contact hole into the interlayer insulating film, and (b) etching a lower film of the multi-layer film by using the interlayer insulating film as a mask.

Preferably, an etching stopper is provided on the semiconductor layer and in step (b) the etching stopper is provided after forming the semiconductor layer on the gate electrode and the gate electrode line.

According to the present invention there is provided a method of manufacturing a liquid crystal display comprising a TFT array substrate, an opposite substrate arranged to be opposite to the TFT array substrate, a liquid crystal material interposed between the TFT array substrate and the opposite substrate, a gate IC, a source IC, at least two circuit boards connected to the TFT array substrate, wherein the TFT array substrate comprises an insulating substrate, a gate electrode formed on the insulating substrate, a gate electrode line formed on the insulating substrate, an insulating film formed on the gate electrode, the gate electrode line and the insulating substrate except for whole of outer surface of the gate electrode and whole of outer surface of the gate electrode line, a semiconductor layer formed on the insulating film, a contact layer formed on the semiconductor layer, a source electrode connected to the contact layer, a drain electrode which is connected to the contact layer, the contact layer being divided into two portions, one of the two portions corresponding to the source electrode and the other one of the two portions corresponding to the drain electrode, a source electrode line connected to the source electrode, an interlayer insulating film formed on the gate electrode, the gate electrode line, the source electrode, the source electrode line and the drain electrode, a pixel electrode which is formed on the interlayer insulating film and is made of transparent conductive film and is connected electrically to the drain electrode through a first contact hole provided in the interlayer insulating film, and a connecting line which is made of a same material that of the pixel electrode and connects electrically at a connecting portion between the gate electrode line and the source electrode line through a second contact hole provided in the insulating film and a third contact hole provided in the semiconductor layer on said source electrode, the insulating film and the interlayer insulating film, the method comprising steps of:

(a) fabricating the TFT array substrate, (b) providing a first alignment film on the TFT array substrate and performing rubbing operation on the TFT array substrate, (c) spreading spacers on the first alignment film, (d) fabricating the opposite substrate, (e) providing a second alignment film on the opposite substrate and rubbing the second alignment film, (f) printing sealing agent on prescribed area of the second alignment film, (g) superposing the opposite substrate on the TFT array substrate, bonding the opposite substrate to the TFT array substrate except for a hole for injecting liquid crystal material and injecting the liquid crystal material between the TFT array substrate and the opposite substrate and bonding the hole for injecting liquid crystal material, (h) cutting the connecting line at the connecting portion, (i) connecting the gate IC and the source IC to the TFT array substrate, (j) connecting the circuit boards to the gate IC and to the source IC respectively.

Preferably, in step (f) sealing agent is provided on prescribed area of the first alignment film in place of the second alignment film.

DETAILED DESCRIPTION

Embodiment 1

Figure 1:
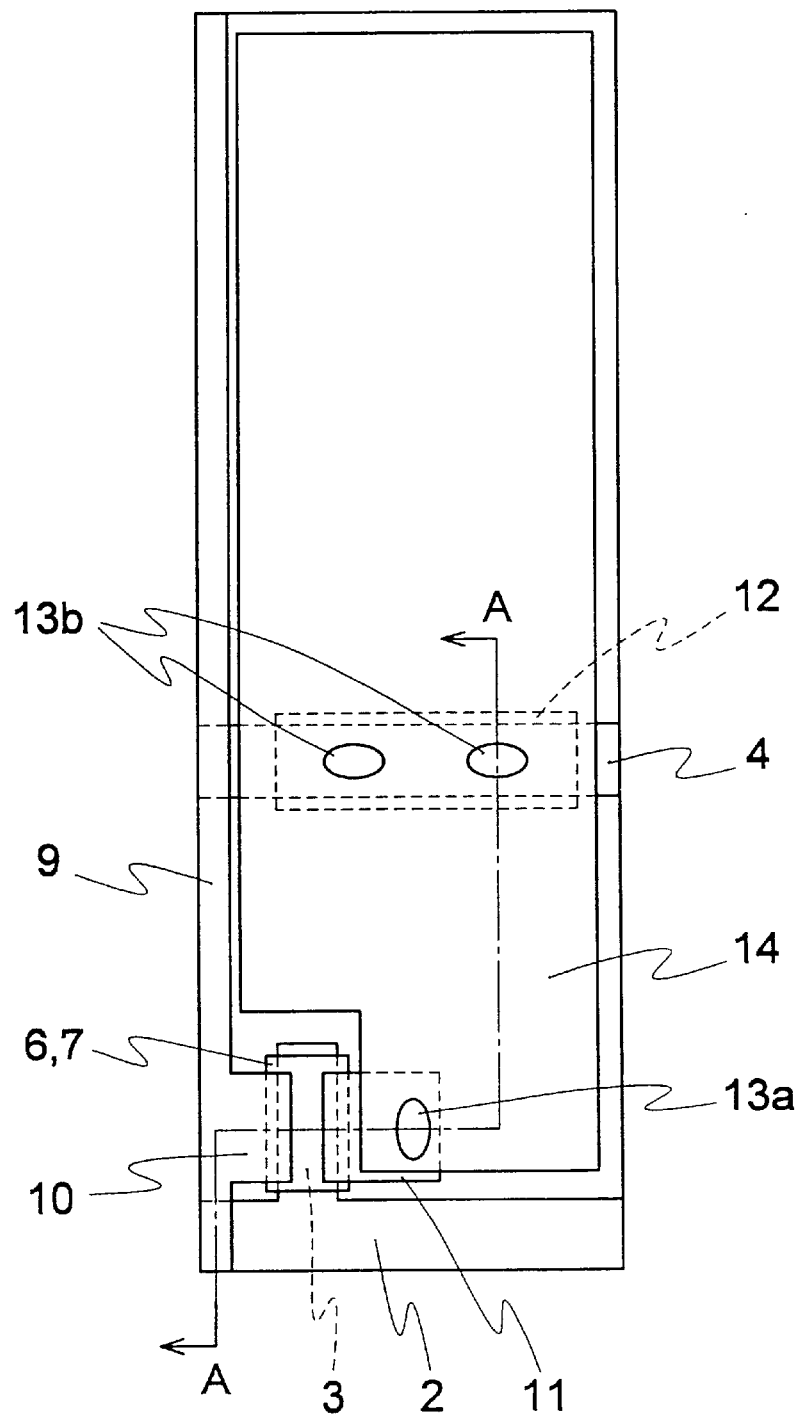
FIG. 1 is a plan view illustrating a TFT array substrate provided in a liquid crystal display according to Embodiment 1 of the present invention.

An AMLCD which is one embodiment of this invention will now be described referring to drawings. FIG. 1 is a plan view showing one pixel of a TFT array substrate on which a channel etch type TFT in the AMLCD according to the embodiment of the invention is provided. FIGS. 2(a) to 2(e) are sectional views showing a manufacturing step of a portion taken along an A—A line shown in FIG. 1, and a connecting (short-circuiting) portion between a gate line and a source line in an end portion of display area (hereinafter referred to as display area end portion).

Referring to FIG. 1 and FIGS. 2(a) to 2(e), reference numeral 1 denotes an insulating substrate made of an insulating material (transparent material can also be employed) such as glass or the like, reference numeral 2 denotes a gate electrode line (hereinafter referred to as a gate line) formed on an insulating substrate 1, and is connected to a gate electrode 3 made of metal such as Cr or the like, reference numeral 4 denotes a common line (a common line for storage capacitance) made of metal such as Cr or the like formed on the insulating substrate 1, reference numeral 5 denotes a gate insulating film made of silicon nitride formed to cover a gate line 2, a gate electrode 3 and a common line 4, reference numeral 6 denotes a semiconductor layer made of a semiconductor of non-doped amorphous silicon or the like formed through a gate insulating film 5 on the gate electrode 3, reference numeral 7 denotes a contact layer formed on the semiconductor layer 6 and composed of a film where impurities such as P or the like are doped by a semiconductor of silicon or the like. The contact layer includes an etched-off region 8. One portion of the contact layer corresponding to the upper portion of the active area is removed by etching, so that the contact layer includes an etched-off region 8 and is divided into two areas shown by references 7a and 7b depending upon the etched-off region 8. Reference numeral 10 denotes a source electrode formed on a contact layer 7a and connected with a source electrode line (hereinafter referred to as a source line), reference numeral 11 denotes a drain electrode formed on the contact layer 7b. The position of the divided area 7a corresponds to the position of the source electrode 10. The position of the divided area 7b corresponds to the position of the drain electrode 11. Reference numeral 12 denotes a storage capacitance electrode formed through a gate insulating film 5 on the common line 4, reference numeral 13 denotes an interlayer insulating film composed of silicon nitride or the like formed to cover gate electrode, gate line, source electrode and drain electrode, and reference numeral 14 denotes a pixel electrode, made of a transparent conductive film such as ITO or the like formed on the interlayer insulating film 13, used to apply a driving voltage upon liquid crystal material.

Reference numeral 13a denotes a contact hole formed in the interlayer insulating film 13 on a drain electrode 11 for connecting a drain electrode 11 with a pixel electrode 14, reference numeral 13b denotes a contact hole formed in the interlayer insulating film 13 on the storage capacitance electrode 12 for connecting the storage capacitance electrode 12 with a pixel electrode 14, reference numeral 13c denotes a contact hole formed in the interlayer insulating film 13 on a source line 9 for connecting a gate line 2 with a source line 9, and reference numeral 13d denotes a contact hole formed in a gate insulating film 5 and an interlayer insulating film 13 on the gate line 2 for connecting the gate line 2 with the source line 9.

Reference numeral 15 denotes a connecting line formed by using a material which is simultaneously formed with a pixel electrode 14 for electrically connecting a gate line 2 with a source line 3 through a contact hole 13c and a contact hole 13d. Reference numeral 24 denotes connecting (shor-circuiting) portion. Reference numeral 31 denotes intersecting portion at which gate line intersects source line. Reference numeral 32 denotes TFT portion. Reference numeral 33 denotes a storage capacitor portion.

A manufacturing method of a TFT array substrate of an AMLCD in this embodiment will now be described.

Figure 2A:
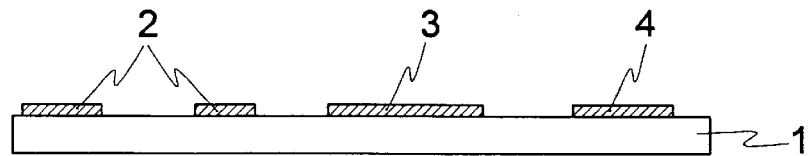
FIGS. 2(a) to 2(e) are sectional views illustrating manufacturing steps for a TFT array substrate provided in a liquid crystal display according to Embodiment 1 of the present invention.

As shown in FIG. 2(a), a conductive material made of a single-layer film composed of either of Cr, Al, Ta, Mo, W, copper (Cu) or either of alloy chiefly composed of them, or a multi-layer film laminated with them is deposited by a sputtering method, an evaporating method or the like on the insulating substrate 1. Then, the deposited conductive film is patterned by using a resist formed by a photolithography process, in order to form a gate line 2, a gate electrode 3 and a common line 4.

Figure 2B:
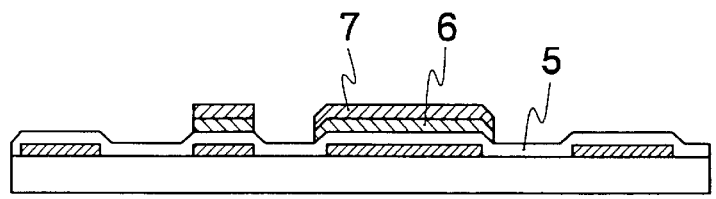

As shown in FIG. 2(b), silicon nitride or the like for composing a gate insulating film 5, then, amorphous silicon, polycrystalline silicon or the like, then, n⁺ amorphous silicon, n⁺ polycrystalline silicon or the like in which impurities such as P or the like are doped in high concentration in the case of n-type TFT are continuously formed by, for example, a plasma CVD method, an atmospheric CVD method or a low pressure CVD method or the like. Then, the formed films are patterned by using a resist formed by a photolithography process, in order to form a semiconductor layer 6 and a contact layer 7.

Figure 2C:
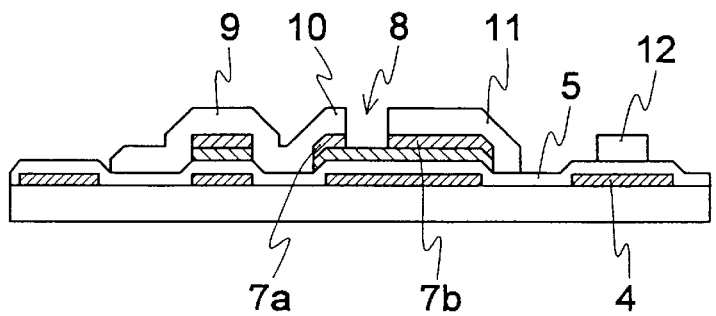

As shown in FIG. 2(c), a thin film composed of a single-layer film made of Cr, Al, titanium (Ti), tantalum (Ta), Mo, W, nickel (Ni) or the like or either of alloy chiefly composed of them, or of multi-layer film laminated with them is deposited by a sputtering method, an evaporating method or the like. Then, the deposited film is patterned by a photolithography process and fine patterning technology, in order to form a source line 9, a source electrode 10, a drain electrode 11, and a storage capacitance electrode 12. With a resist for continuously forming a source electrode 10 and a drain electrode 11 or a source electrode 10 and a drain electrode 11 as a mask, a contact layer 7 is removed by etching from a channel area, in order to provide an etched-off region 8 in a contact layer 7.

Figure 2D:
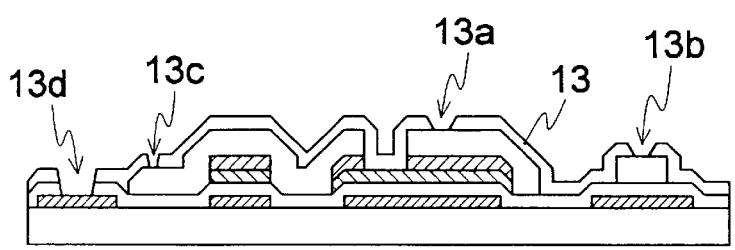

As shown in FIG. 2(d), an interlayer insulating film 13 composed of silicon nitride, silicon oxide, inorganic insulating film or organic insulating film is formed. Then, interlayer insulating film is etched by using a resist formed through a photolithography process, in order to form contact holes 13a, 13b, 13c and 13d in an interlayer insulating film 13. At this time, the contact holes 13a, 13b, 13c and 13d are desirably formed by etching in such a manner that the wall of the contact hole is tapered.

The contact hole 13d on the gate line 2 is desirably formed by etching at one time a gate insulating film 5 and an interlayer insulating film 13 on a gate line 2. But when a photosensitive organic insulating film is used as an interlayer insulating film 13 after a contact hole is formed in the interlayer insulating film 13, the gate insulating film 5 can be etched by using an interlayer insulating film 13 as a mask. Further, when an interlayer insulating film 13 which is not photosensitive is used, a gate insulating film 5 can be etched by using a resist used to form a contact hole in an interlayer insulating film 13 or by using an interlayer insulating film 13 after removing the resist, as a mask. When a gate insulating film 5 is formed by using silicon nitride or the like, a contact hole is provided in the interlayer insulating film 13, by etching in such a manner that the wall of the contact hole is tapered (taper etching). Then, a mixed gas chiefly composed of either of $SF_6+O_2$, $CF_4+O_2$, $HCl+O_2$ and $F+O$, or a mixed gas including either of $SF_6$, $CF_4$, HCl and F, capable of taper etching can be used.

The etching method can be either of a wet etching method and a dry etching method.

Figure 2E:
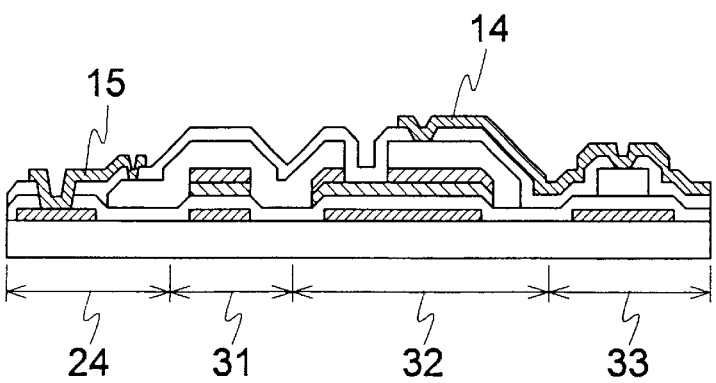

Finally, as shown in FIG. 2(e), a transparent conductive film of ITO or the like is formed. Then, the formed film is patterned by using a photolithography process, in order to form a pixel electrode 14. At this time, in a display area end portion, a connecting line 15 for electrically connecting a gate line 2 with a source line 3 is formed of a transparent conductive film through a contact hole 13c and a contact hole 13d. The pixel electrode 14 is electrically connected with a drain electrode 11 through a contact hole 13a, and a storage capacitance electrode 4 through a contact hole 13b.

A TFT array substrate having structure where a channel etch type TFT is mounted by the aforementioned step and a gate line 2 and a source line 9 are short-circuited to prevent the electrostatic breakdown of TFT can be formed by conducting five photolithography processes.

Further, a manufacturing method of AMLCD in this embodiment will now be described.

A first alignment film is formed on the first surface of TFT array substrate. The first surface of the TFT array substrate is to be inside surface of the AMLCD when the TFT array substrate and the opposite substrate are superposed through the liquid crystal material. Rubbing is performed on the surface of the alignment film with a rubbing cloth. After rubbing alignment film, spacers for keeping a gap of the TFT array substrate and the opposite substrate uniform within the display area are spread on the surface of the alignment film.

On the other hand, a second alignment film is formed on the first surface of the opposite substrate. Also, color filters can be provided on the opposite substrate.

The first surface of the opposite substrate is to be inside surface of the AMLCD. A rubbing operation is performed on the surface of the alignment film of the opposite substrate with a rubbing cloth. After rubbing, sealing agent is applied on the prescribed area, i. e., prescribed area on the periphery of first surface of the opposite substrate.

Thus formed two substrates, i.e., the TFT array substrate and the opposite substrate are superposed with keeping the gap between the TFT array substrate and the opposite substrate a prescribed value, and the opposite substrate is bonded to the TFT array substrate on the periphery except for a hole for injecting (injecting spout) liquid crystal material to form a liquid crystal display panel. Then, a liquid crystal material is injected from the injecting spout into the gap between the TFT array substrate and the opposite substrate. After injecting the liquid crystal material, the injecting spout is choked with the sealing agent. At this moment, sealing agent can be applied on the TFT array substrate in place of on the opposite substrate. Also, spacers can be spread on the opposite substrate in place of on the TFT array substrate.

After obtaining a liquid crystal display panel, a connecting line is cut at a connecting portion 24 at which one gate line 2 and one source line 9 are short-circuited.

The connecting portion was provided in order to prevent from generation of static electricity, since such static electricity generates when rubbing is performed, a TFT tends to be broken down. Accordingly, obtaining a liquid crystal panel, the connecting portion is not necessary. In TFT array process, there is an advantage that breakdown of a TFT caused by static electricity does not occurred.

In the next step, a gate IC of a gate side driving circuit and a source IC of a source side driving circuit are connected to the TFT array substrate at desired portions respectively. Source ICs, gate ICs and driving circuits are provided on the pheriphery of the TFT array substrate. Source ICs connect a source side driving circuit and the TFT array substrate. Gate ICs connect a gate side driving circuit and the TFT array substrate. Connecting method is for example a tape automated bonding (TAB) method. In place of TAB method, chip on glass (COG) method can also be adopted. If COG method is adopted, the above-mentioned connecting line at the connection portion can be made disconnected either in this step or in the prior step.

In the next step, circuit boards are connected electrically to the gate IC and source IC respectively. A number of gate IC and a number of source IC are optional. Similarly, a number of circuit boards is optional. Connecting methods such as TAB, COG or the like can be selected.

As described above, a liquid crystal display connected with circuit boards is obtained as module and can be driven electrically.

Figure 18:
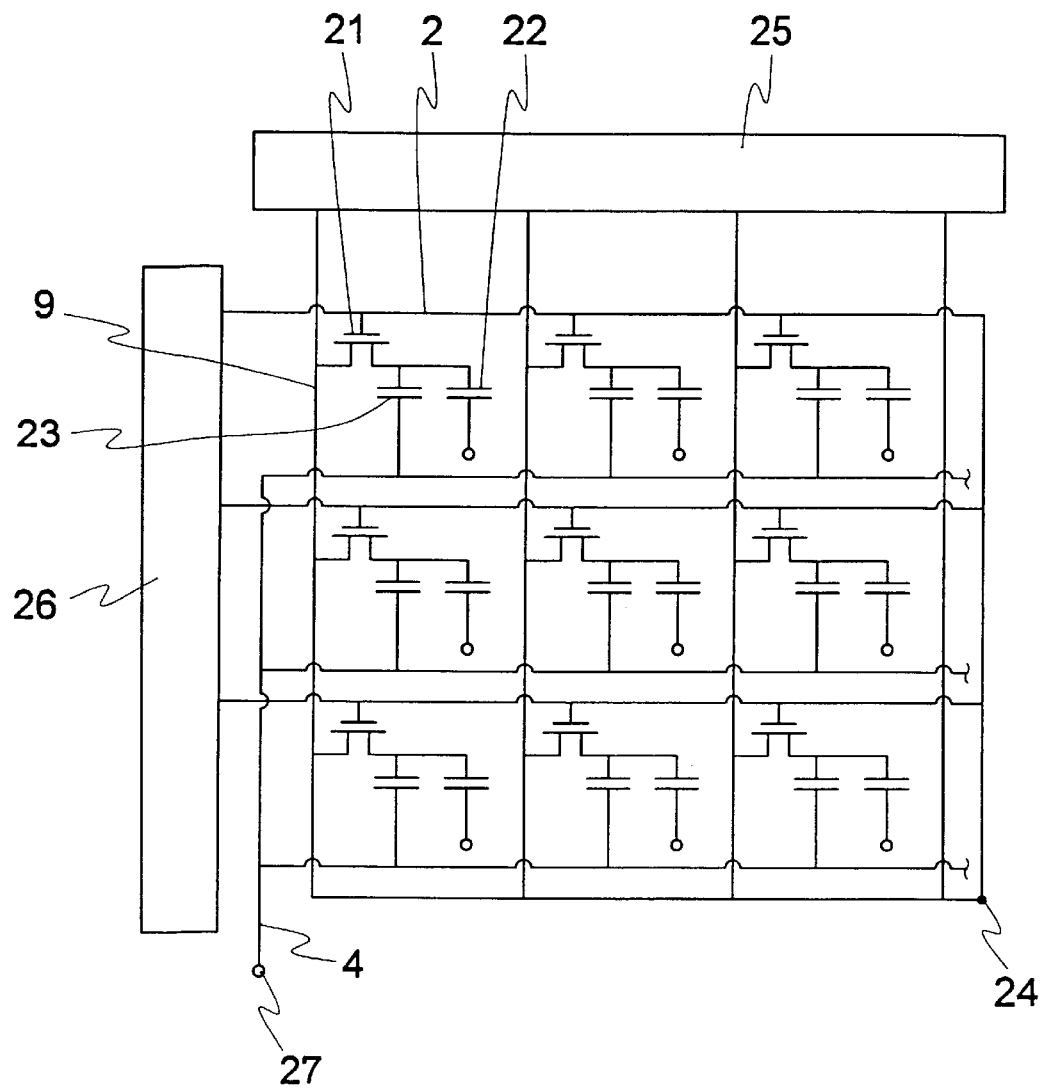
FIG. 18 is a diagram illustrating an equivalent circuit of a liquid crystal display.
Figure 19:
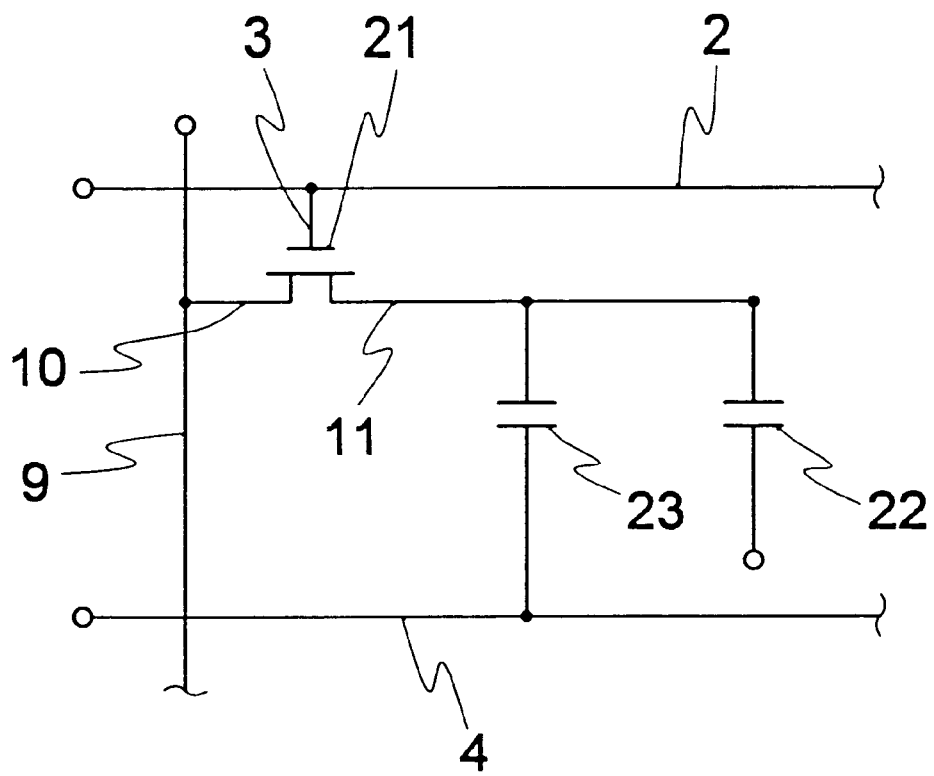
FIG. 19 is a diagram illustrating an equivalent circuit of one pixel of a liquid crystal display.
Figure 20:
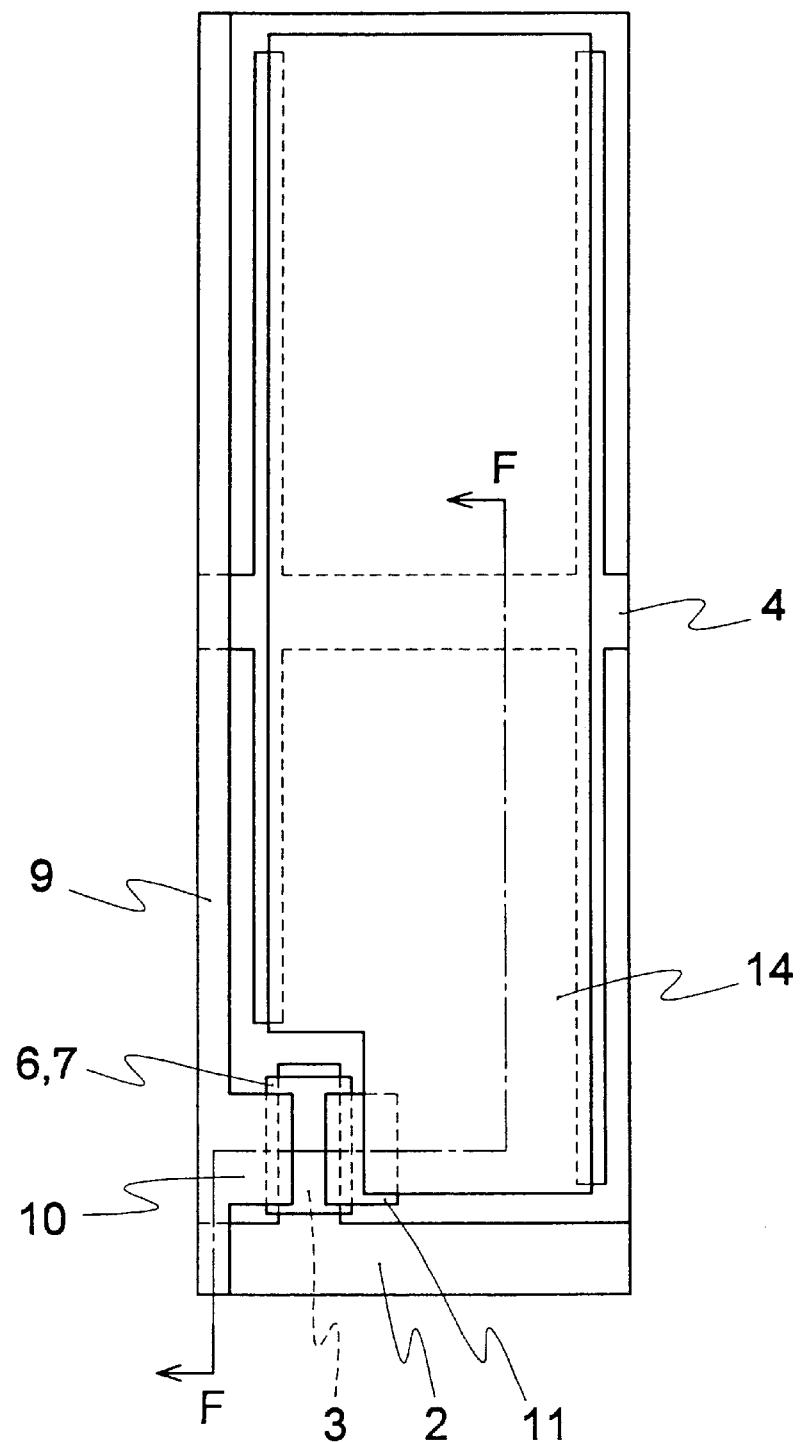
FIG. 20 is a plan view illustrating a TFT array substrate provided in a conventional liquid crystal display.
Figure 21A:
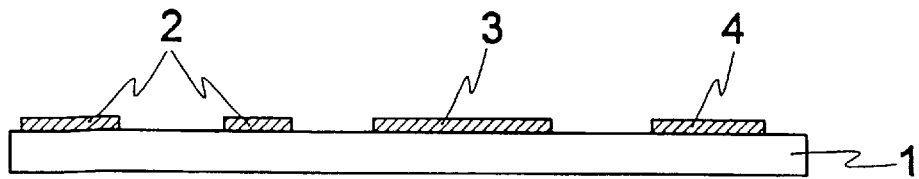
FIGS. 21(a) to 21(f) are sectional view illustrating a TFT array substrate provided in a conventional liquid crystal display.
Figure 21B:
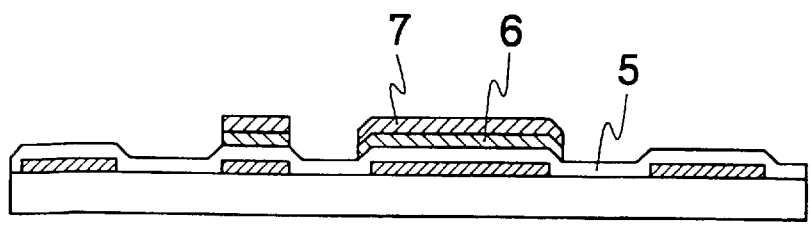
Figure 21C:
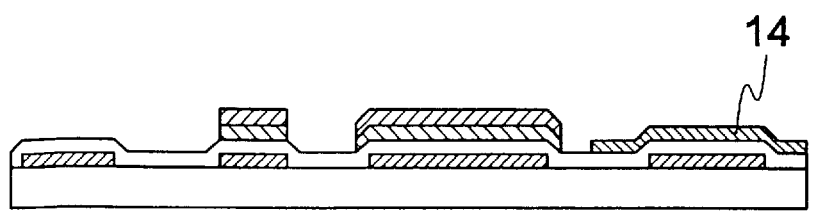
Figure 21D:
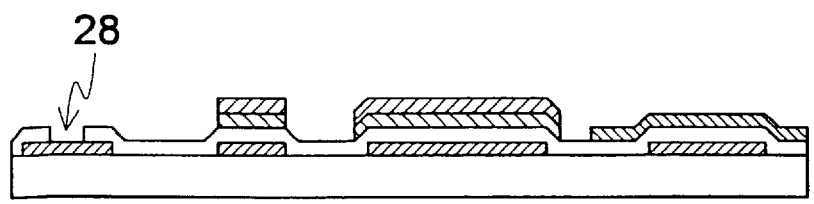
Figure 21E:
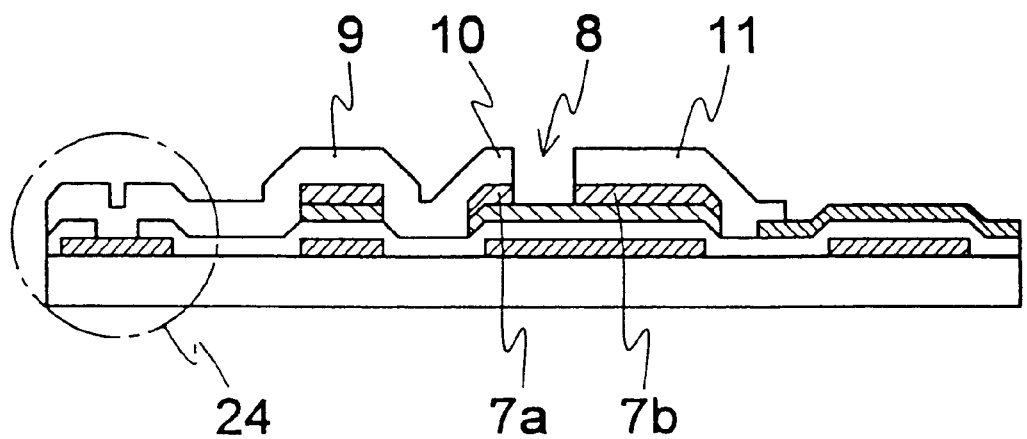
Figure 21F:
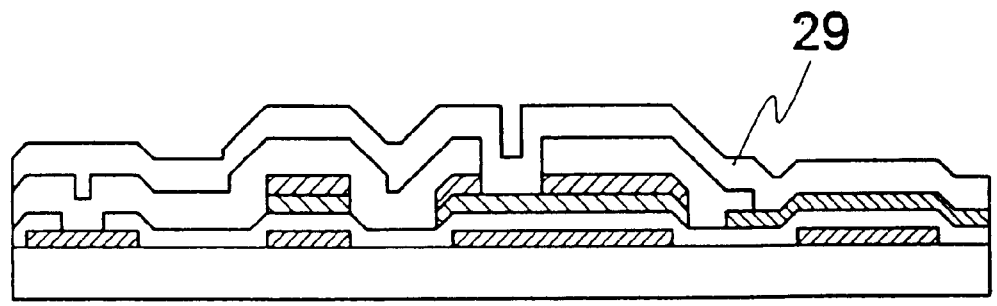

The function of an AMLCD in this embodiment will now be described referring to FIGS. 1, 2(a) through 2(e) and 18. Referring to FIG. 18, reference numeral 21 denotes a TFT, reference numeral 22 denotes pixel capacitance (in equivalent circuit) provided by liquid crystal material, reference numeral 23 is a storage capacitance, reference numeral 24 denotes a connecting (short-circuiting) portion of a gate line 2 and a source line 9 located in a display area end portion, reference numeral 25 denotes a source side driving circuit, reference numeral 26 denotes a gate side driving circuit, and reference numeral 27 denotes a terminal for applying a voltage to a common line 4. A voltage is applied and scanned to each gate electrode 3 through a gate line 2 and a TFT 21 is turned on. An image signal is applied upon a source line 9. A current flows through a source electrode 10, a semiconductor layer 6, a drain electrode 11 which compose a TFT 21. A voltage corresponding to a desired image signal is applied to liquid crystal material 22 through a pixel electrode 14 connected with a drain electrode 11. Storage capacitance 23 provided by a common line 4, a gate insulating film 5 and a storage capacitance electrode 12 is connected to prevent a voltage, applied upon the liquid crystal material 22 due to influences through parasitic capacitance and leak current, from being varied, corresponding to a switching operation of a TFT 21.

The gate line 2 and the source line 9 are electricity connected, in the connecting portion 24 of the display area end portion, with a contact holes 13c and 13d provided in an interlayer insulating film 13 and with a connecting line 15. The TFT 21 is prevented from being broken due to electrostatic force to be caused by manufacturing steps of the TFT array substrate and at the rubbing alignment film.

After the rubbing step has been completed, a connecting portion 24 between a gate line 2 and a source line 9 can be disconnected. Without disconnecting, an electric component of sufficiently high resistance can be inserted in connecting portion 24.

According to the invention, in an AMLCD having structure where a gate line 2 and a source line 9 are short-circuited to prevent the electrostatic breakdown of the TFT, a gate insulating film 5 and an interlayer insulating film 13 on a gate line 2, contact holes 13d and 13c to the interlayer insulating film 13 on the source line 9, and a contact hole 13a for connecting a drain electrode 11 with a pixel electrode 14 are formed at the same time. Further, the connecting line connects the gate line 2 and the source line 9 through a contact holes 13c and 13d. The connecting line 15 is formed at the same time with the formation of the pixel electrode 14. Thus, a contact hole forming step for connecting the a gate line 2 and the source line 9 shown in the conventional example is unnecessary. The frequency of the photolithography steps in manufacturing the TFT array substrate can be reduced by one as compared with the conventional example. The manufacturing step can be simplified, so that the manufacturing cost is reduced and throughput is enhanced.

Embodiment 2

Figure 3:
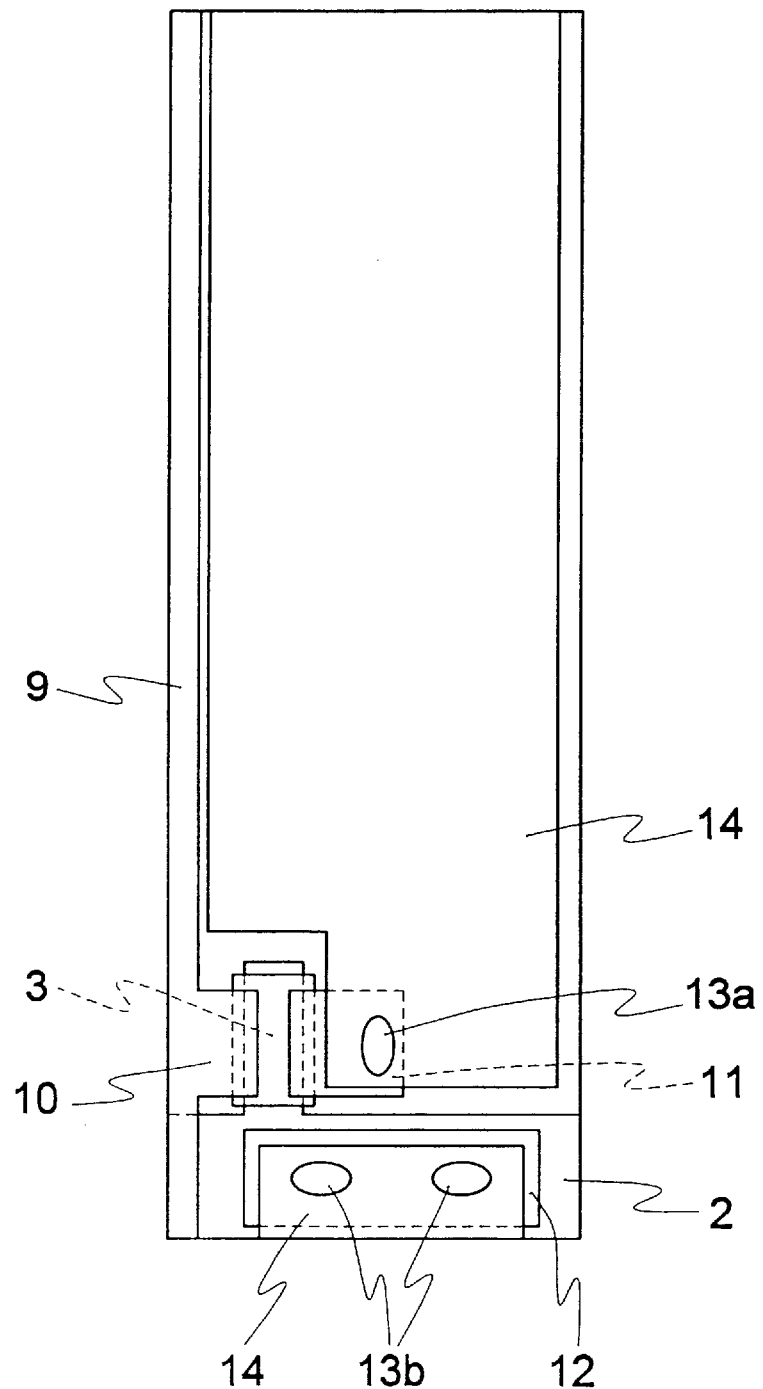
FIG. 3 is a plan view illustrating a TFT array substrate provided in a liquid crystal display according to Embodiment 2 of the present invention.

In the embodiment 1, a common line system is shown as a method of forming storage capacitance. Even in a case where a storage capacitance on gate system is adopted as shown in FIG. 3, an effect similar to that in the embodiment 1 can be obtained.

In the present embodiment, a common line 4 in FIG. 1 becomes unnecessary. The storage capacitance electrode 12 which is formed on the inner side of the gate line 2, can be protruded from the gate line 2 in a direction (on a lower side in FIG. 3) not in contact with a source line 9, a source electrode 10 and a drain electrode 11. The remaining configuration and a manufacturing method are similar to those of the embodiment 1, and hence, explanation thereof is omitted.

Embodiment 3

In the embodiment 1, a storage capacitance electrode 12 is formed simultaneously in forming a source electrode 10 and a drain electrode 11. Storage capacitance 23 is provided by a storage capacitance electrode 12, a gate insulating film 5, and a common line 4. As shown in FIG. 4 and FIGS. 5(a) to 5(e), storage capacitance is formed by a pixel electrode 14, an interlayer insulating film 13, a gate insulating film 5 and a common line 4. Thus, an effect similar to that of the embodiment 1 is obtained. At this time, since the storage capacitance electrode 12 in FIG. 1 becomes unnecessary, occurrence of defect such as short circuit caused by contact between source line which is formed on a same layer as the storage capacitance electrode 12 and the storage capacitance line 12 by patterning failure.

Figure 4:
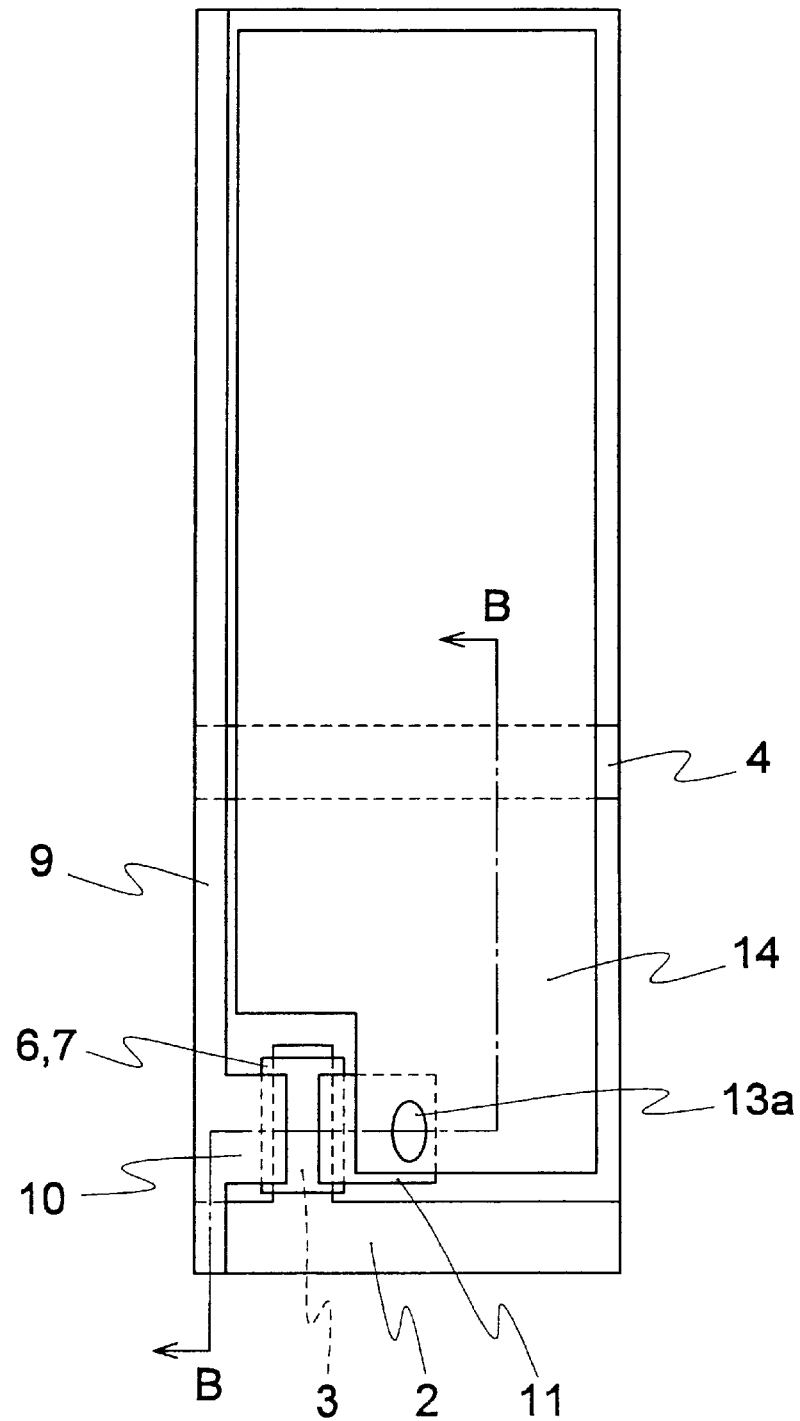
FIG. 4 is a plan view illustrating a TFT array substrate provided in a liquid crystal display according to Embodiment 3 of the present invention.

FIG. 4 is a plan view showing one pixel of a TFT array substrate in the embodiment 3. FIGS. 5(a) to 5(e) are sectional views showing manufacturing steps of a portion taken along a line B—B of FIG. 4, and a connecting (short-circuiting) portion between a gate line and a source line in a display area end portion. Since the reference numerals in FIG. 4 and FIGS. 5(a) to 5(e) are similar to those of the embodiment 1, explanation thereof is omitted.

Figure 5A:
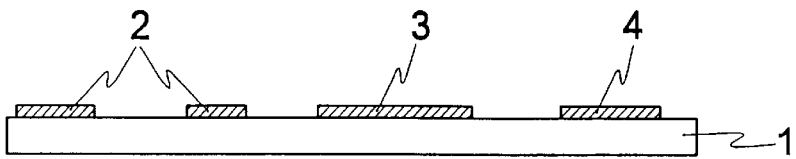
FIGS. 5(a) to 5(e) are sectional views illustrating manufacturing steps for a TFT array substrate provided in a liquid crystal display according to Embodiment 3 of the present invention.
Figure 5B:
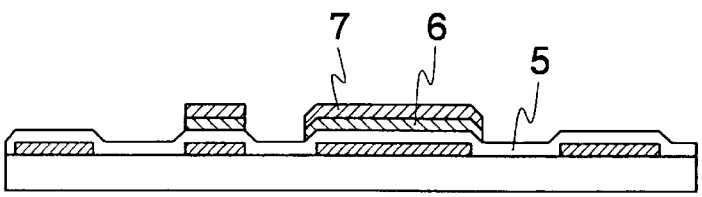
Figure 5C:
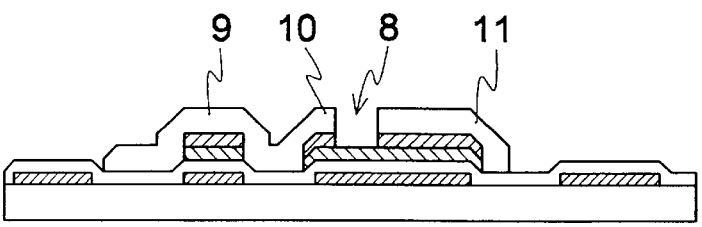
Figure 5D:
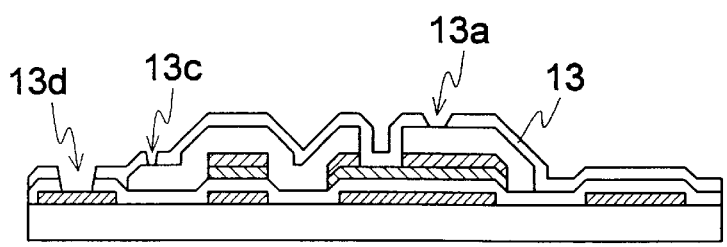
Figure 5E:
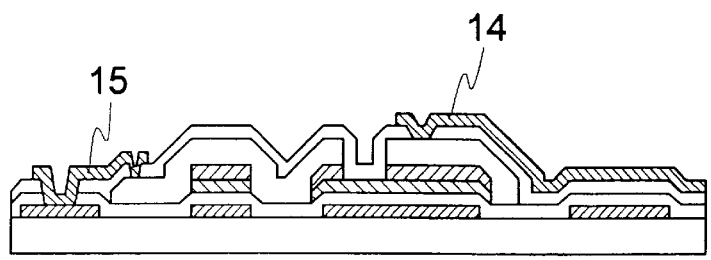

A manufacturing method will now be described. By a method similar to that of the embodiment 1, a gate line 2, a gate electrode 3 and a common line 4 as shown in FIG. 5(a), a gate insulating film 5, a semiconductor layer 6 and a contact layer 7 as shown in FIG. 5(b), a source line 9, a source electrode 10, a drain electrode 11, and a recess 8 of a contact layer 7 as shown in FIG. 5(c) are provided. As shown in FIG. 5(d), interlayer insulating film 13 is etched by using a resist formed by a photolithography process after an interlayer insulating film 13 has been formed, in order to provide contact holes 13a, 13c and 13d in the interlayer insulating film 13. Finally, as shown in FIG. 5(e), a connecting line 15 for electrically connecting the gate line 2 with a source line 3 through a pixel electrode 14, a contact hole 13c, and a contact hole 13d is formed. The pixel electrode 14 is connected electrically with a drain electrode through a contact hole 13a.

A TFT array substrate having structure where a channel etch type TFT is mounted by an aforementioned step and a gate line 2 and a source line 9 are short-circuited for preventing the electrostatic breakdown of the TFT is formed by five photolithography steps.

Embodiment 4

Figure 6:
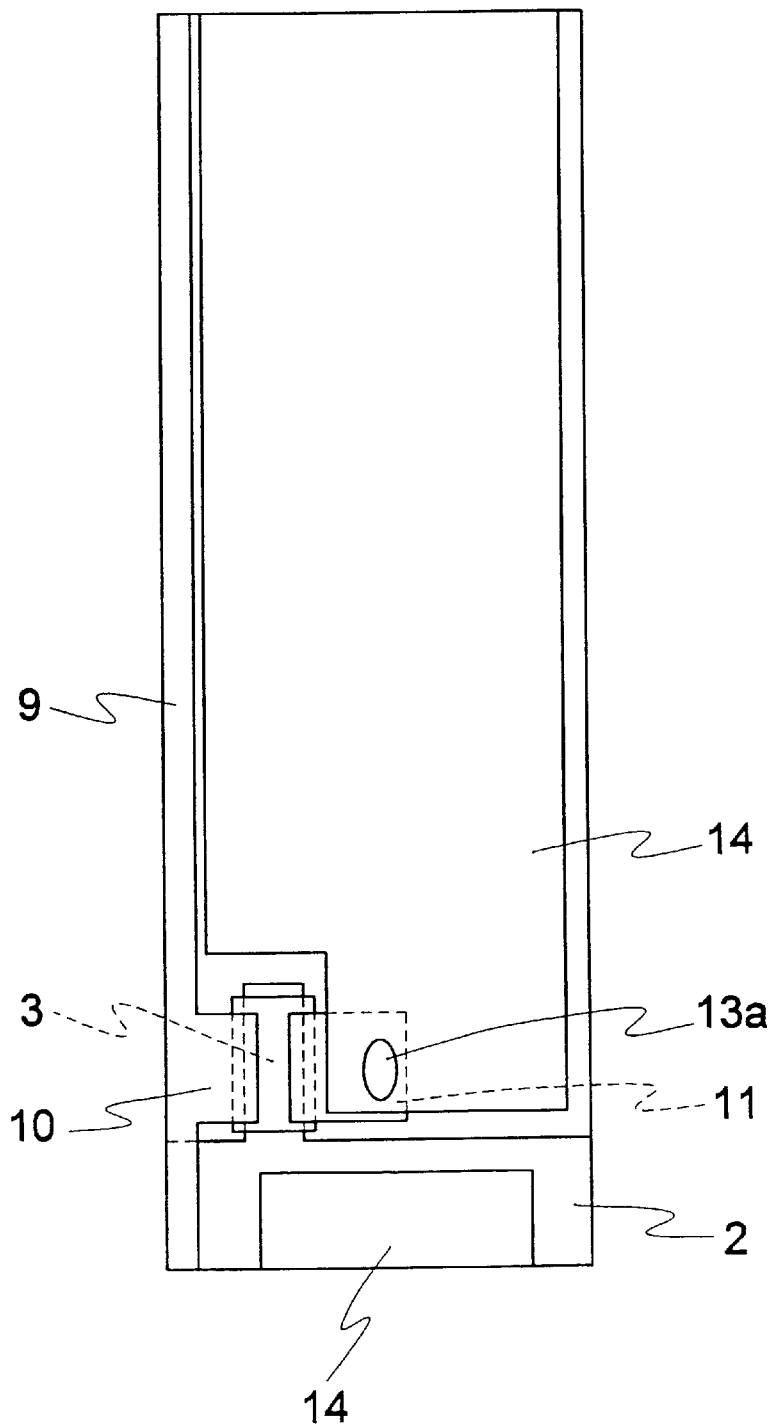
FIG. 6 is a plan view illustrating a TFT array substrate provided in a liquid crystal display according to Embodiment 4 of the present invention.

In the embodiment 3, a common line system is shown as a method of forming a storage capacitance. Even when a storage capacitance on gate system is adopted as shown in FIG. 6, an effect similar to that of the embodiment 3 can be obtained.

A storage capacitance common line 4 in FIG. 5(a) in the embodiment becomes unnecessary. Other configuration and a manufacturing method are similar to those of the embodiment 3, and hence explanation thereof is omitted.

Embodiment 5

In the embodiment 1, a storage capacitance electrode 12 and a drain electrode 11 for forming storage capacitance 23 are connected through a pixel electrode 14. As shown in FIG. 7 and FIGS. 8(a) to 8(e), a drain electrode 11 is extended up to the upper portion above the common line 4 to form a storage capacitance electrode 12. An effect similar to that of the embodiment 1 is obtained, and a drain electrode 12 and a contact hole 13a of a pixel electrode 14 become unnecessary, in order to reduce the probability to be caused due to disconnection in a contact hole. A TFT array can be inspected before forming the pixel electrode 14 by using an inspecting apparatus, which inspects the TFT array by using the charging condition of the storage capacitance.

Figure 7:
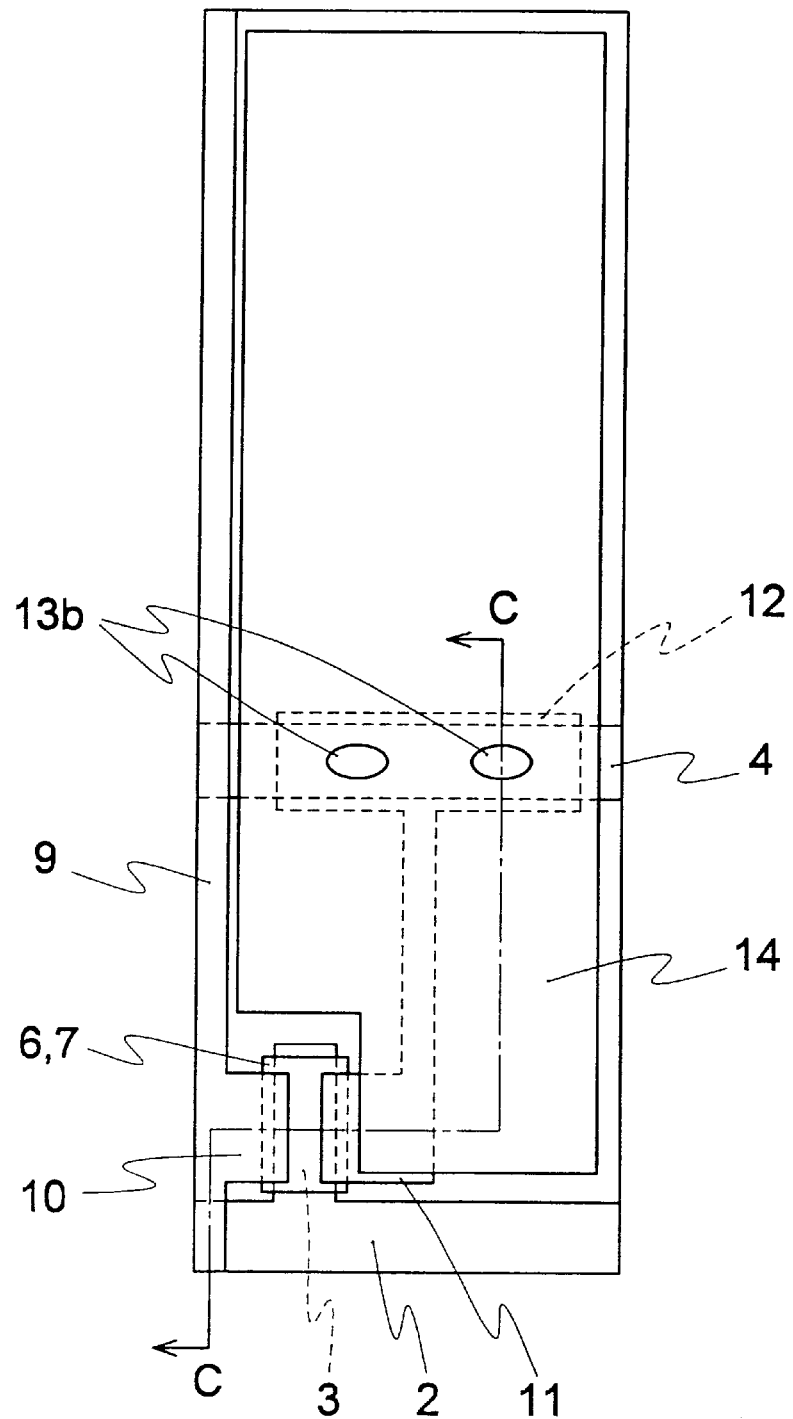
FIG. 7 is a plan view illustrating a TFT array substrate provided in a liquid crystal display according to Embodiment 5 of the present invention.

FIG. 7 is a plan view showing one pixel of the TFT array substrate of the embodiment 5. FIGS. 8(a) to 8(e) are sectional views showing steps of manufacturing a portion taken along a line C—C of FIG. 7, and a connecting (short-circuiting) portion between a gate line and a source line in a display area end portion. Since reference numerals shown in FIGS. 8(a) to 8(e) are similar to those of the embodiment 1, explanation thereof is omitted.

Figure 8A:
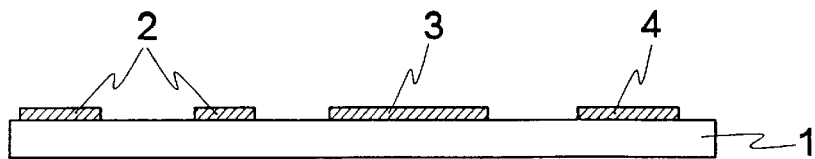
FIGS. 8(a) to 8(e) are sectional views illustrating manufacturing steps for a TFT array substrate provided in a liquid crystal display according to Embodiment 5 of the present invention.
Figure 8B:
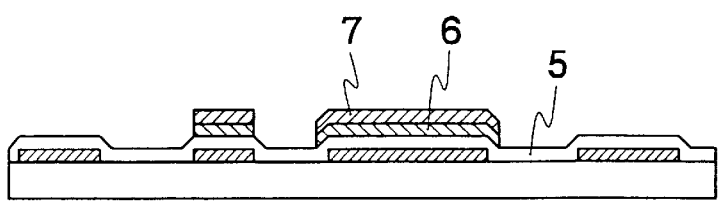
Figure 8C:
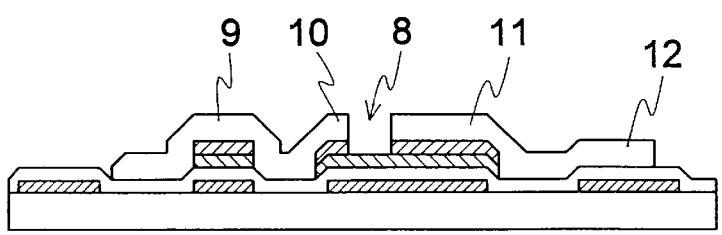
Figure 8D:
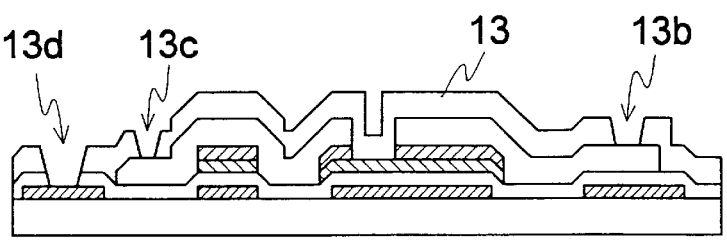
Figure 8E:
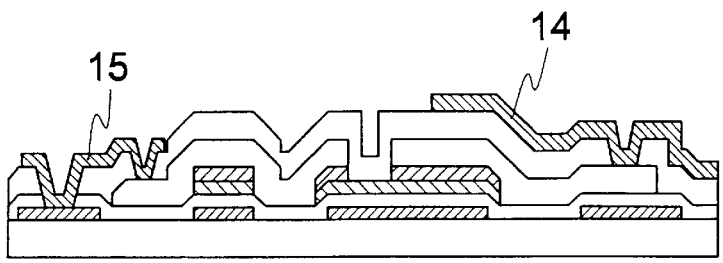

A manufacturing method will now be described. By a method similar to that of the embodiment 1, a gate line 2, a gate electrode 3 and a common line 4 are formed as shown in FIG. 8(a), and a gate insulating film 5, a semiconductor layer 6 and a contact layer 7 are formed as shown in FIG. 8(b). As shown in FIG. 8(c), a source line 9, a source electrode 10, a drain electrode 11, and a storage capacitance electrode 12 which is formed by extending the drain electrode 11 are formed. Then, an etched-off region 8 of the contact layer 7 is formed. As shown in FIG. 8(d), an interlayer insulating film 13 is formed. Then, prescribed portions in the interlayer insulating film are etched by using resist formed through a photolithography process and contact holes 13b, 13c and 13d are formed in an interlayer insulating film 13. Finally, as shown in FIG. 5(e), a connecting line 15 is formed for electrically connecting a gate line 2 with a source line 3 through a pixel electrode 14, and contact holes 13c, contact holes 13d. The pixel electrode 14 is electrically connected with a drain electrode 11 formed integrally with a storage capacitance electrode 12 through a contact hole 13b.

A TFT array substrate having configuration where a drain electrode 11 and a pixel electrode 14 are connected with each other can be formed by five photolithography processes through a short-circuiting portion between a gate line 2 and a source line 9 for preventing the breakdown of the TFT and a storage capacitance electrode formed by extending a drain electrode 11.

A configuration for forming a storage capacitance electrode 12 by extending a drain electrode 11 is applied to a TFT array substrate where a pixel electrode 14 is formed in an upper layer above a source electrode 10 and a drain electrode 11, thus making it possible to inspect a TFT array before the formation of a pixel electrode 14.

Embodiment 6

In the embodiment 1, a pixel electrode 14 is formed not to be superposed on a gate line 2 and a source line 9. As shown in FIG. 9 and FIGS. 10(a) to 10(e), when an interlayer insulating film 13 is formed to be sufficiently thick and to reduce the parasitic capacitance between a pixel electrode 14 and a source line 9, a pixel electrode 14 can be superposed on a source line 9 and a gate line 2. An effect similar to that of the embodiment 1 can be obtained, and an aperture ratio is enhanced.

Figure 9:
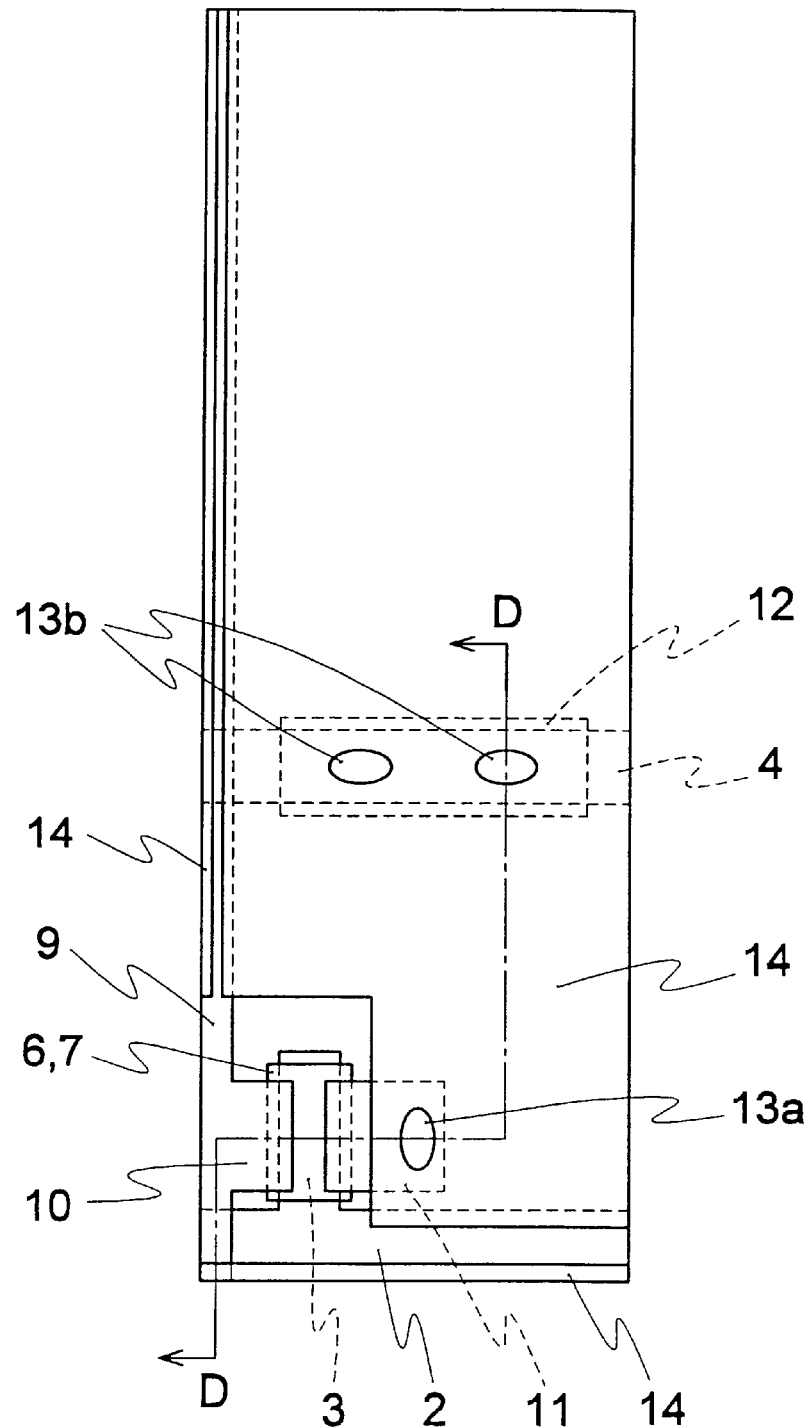
FIG. 9 is a plan view illustrating a TFT array substrate provided in a liquid crystal display according to Embodiment 6 of the present invention.

FIG. 9 is a plan view showing one pixel of a TFT array substrate of the embodiment 6. FIGS. 10(a) to 10(e) are sectional views showing steps of manufacturing a connecting (short-circuiting) portion between a gate line and a source line in a portion taken along a line of D—D of FIG. 9, and a display area end portion. Since reference numerals FIGS. 10(a) to 10(e) are similar to those of the embodiment 1, explanation thereof is omitted.

Figure 10A:
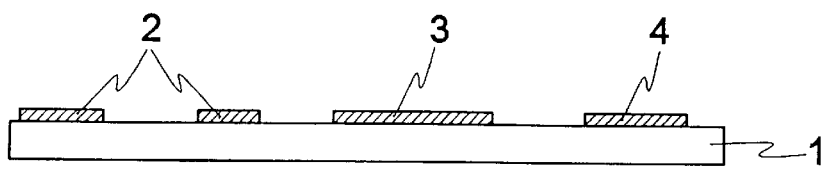
FIGS. 10(a) to 10(e) are sectional views illustrating manufacturing steps for a TFT array substrate provided in a liquid crystal display according to Embodiment 6 of the present invention.
Figure 10B:
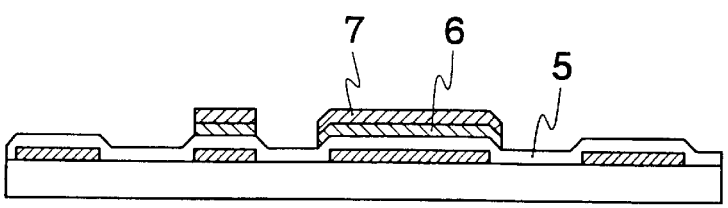
Figure 10C:
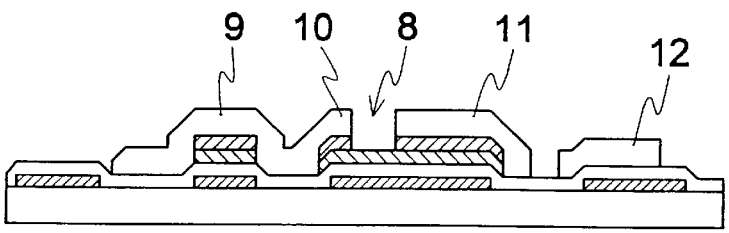

A manufacturing method will now be described. By a method similar to that of the embodiment 1, a gate line 2, a gate electrode 3 and a common line 4 are formed as shown in FIG. 10(a), and a gate insulating film 5, a semiconductor layer 6 and a contact layer 7 are formed as shown in FIG. 10(b). As shown in FIG. 10(c), a source line 9, a source electrode 10, a drain electrode 11, and a storage capacitance electrode 12 are formed. Then, an etched-off region 8 of the contact layer 7 is formed.

Figure 10D:
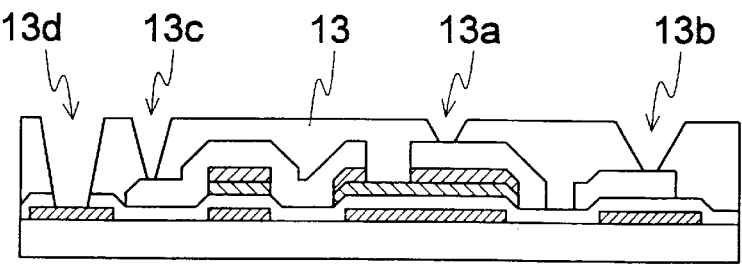

As shown in FIG. 10(d), an interlayer insulating film 13 of thick film is formed. Then, contact holes 13a, 13b, 13c and 13d are provided in an interlayer insulating film 13 by etching by using a resist formed through a photolithography process. At this time, contact holes 13a, 13b, 13c and 13d are desired to be provided by taper etching. Further, when a photosensitive material is employed as an interlayer insulating film of thick film, a resist is not necessary for perforating a contact hole. An acrylic resin or the like can be employed as an interlayer insulating film.

The contact hole 13d on the gate line 2 is desirably formed by etching a gate insulating film 5 and an interlayer insulating film 13 on the gate line 2 continuously. When a photosensitive organic insulating film is used as an interlayer insulating film 13 after a contact hole is formed in the interlayer insulating film 13, a gate insulating film 5 can be etched by using the interlayer insulating film 13 as a mask. When an interlayer insulating film 13 which is not photosensitive is used, a gate insulting film 5 can be etched by using a resist used to provide a contact hole in an interlayer insulating film 13 as a mask, or can be etched by using an interlayer insulating film 13 after a resist is removed as a mask. When a gate insulating film 5 is formed by using silicon nitride or the like, a contact hole is provided in the interlayer insulating film 13, by conducting a taper etching operation, a mixed gas chiefly composed of either of $SF_6 + O_2$, $CF_4 + O_2$, $HCl + O_2$ and $F + O$, or a mixed gas including either of $SF_6$, $CF_4$, HCl and F, capable of a taper etching can be used.

The etching method can be either of a wet etching method and a dry etching method.

Figure 10E:
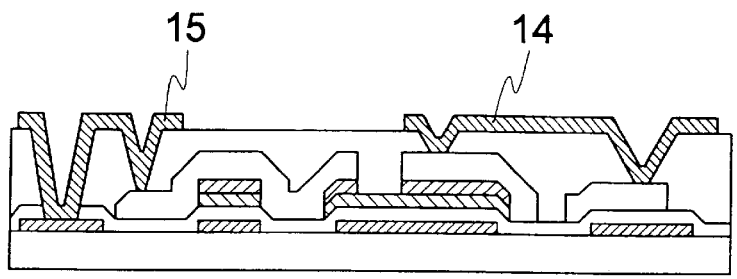

Finally, as shown in FIG. 10(e), a connecting line 15 is formed for electrically connecting a gate line 2 with a source line 3 through a pixel electrode 14, and contact holes 13c and contact holes 13d. The pixel electrode 14 is electrically connected with a drain electrode 11 through a contact hole 13a, and with a storage capacitance electrode 12 through a contact hole 13b.

A short-circuiting portion between a gate line 2 and a source line 9 of preventing the electrostatic breakdown of a TFT and a TFT array substrate having a configuration where a pixel electrode 14 has a superposed portion between a source line 9 and a gate line 2 through an interlayer insulating film 13 of thick film can be formed by a five photolithography processes.

Embodiment 7

Figure 11:
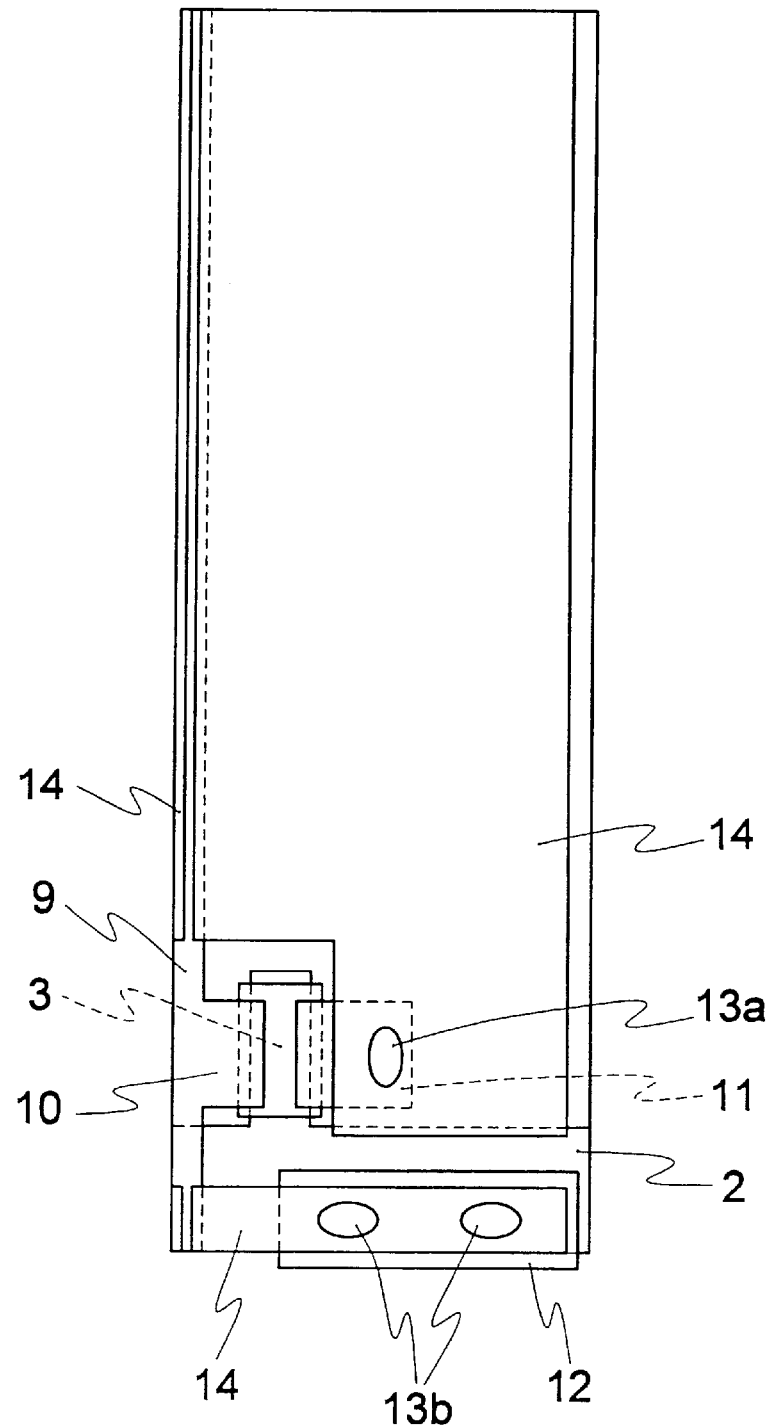
FIG. 11 is a plan view illustrating a TFT array substrate provided in a liquid crystal display according to Embodiment 7 of the present invention.

In the embodiment 6, a common line system is shown as a method of forming a storage capacitance. Even when a storage capacitance on gate type is adopted as shown in FIG. 11, an effect similar to that of the embodiment 6 is obtained.

A storage capacitance common line 4 in FIG. 10(a) in the embodiment becomes unnecessary. Since other configuration and a manufacturing method are similar to those of the embodiment 6, explanation thereof is omitted.

Embodiment 8

In an AMLCD having a configuration where a storage capacitance electrode 12 is formed by extending a drain electrode 11 up to an upper portion above a common line 4, as shown in the embodiment 5, when an interlayer insulating film 13 is formed to be sufficiently thick and to reduce parasitic capacitance between a pixel electrode 14 and a source line 9 as shown in FIG. 12 and FIGS. 13(a) to 13(e), a pixel electrode 14 can be superposed on a source line 9 and a gate line 2. According to this embodiment, an effect similar to that of the embodiment 1 can be obtained, in order to improve an aperture ratio. A TFT array can be inspected before forming the interlayer insulating film 13 by using an inspecting apparatus, manufactured by International Business Machines Corporation, which inspects the TFT array with the charging condition of the storage capacitance. Therefore, when organic resin or the like is used as an interlayer insulating film 13, since before forming the organic resin film, inspection of TFT array and repair of lines by laser irradiation (line cutting or the like) can be performed, an organic film can be prevented from being damaged when repair of lines is performed.

Figure 12:
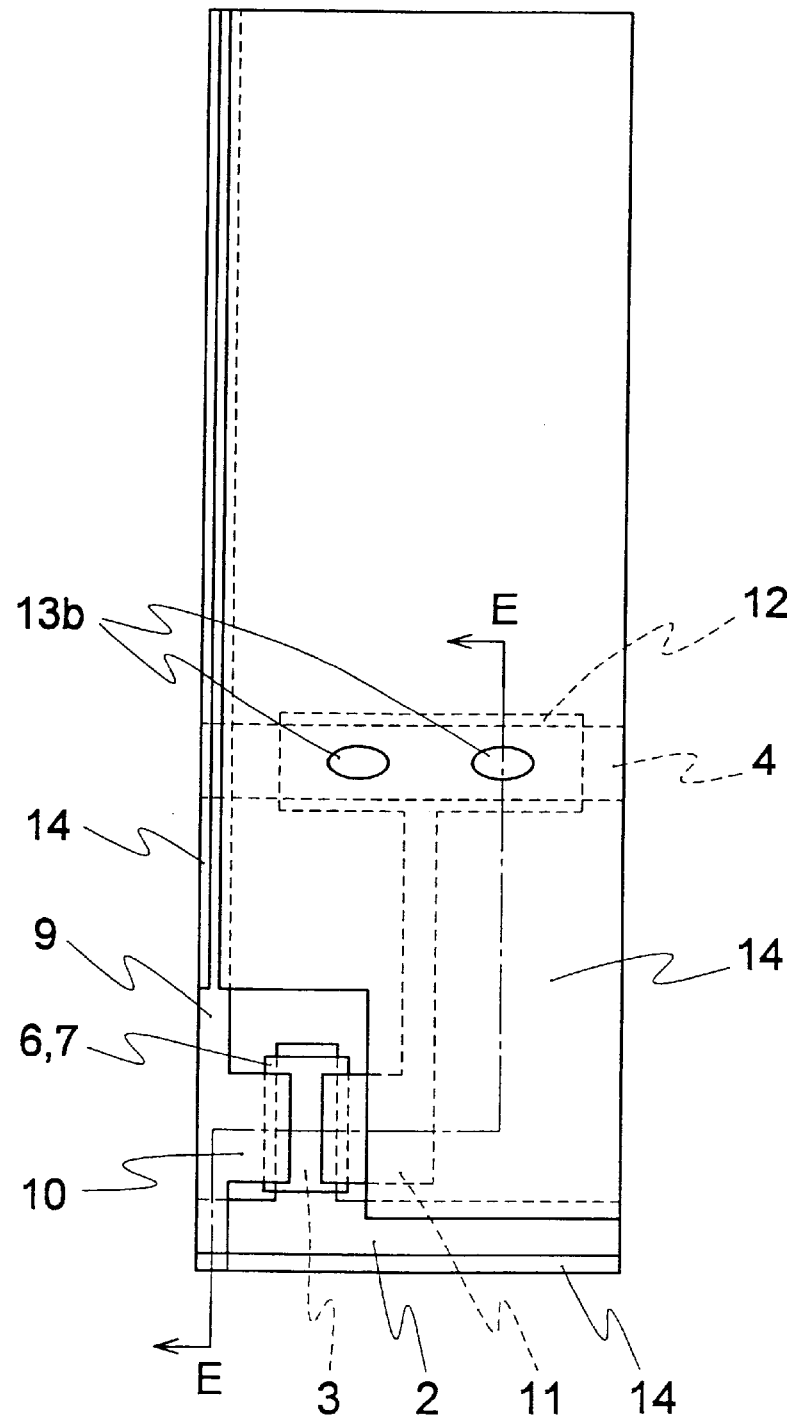
FIG. 12 a plan view illustrating a TFT array substrate provided in a liquid crystal display according to Embodiment 8 of the present invention.

FIG. 12 is a plan view showing one pixel of the TFT array substrate of the embodiment 8. FIGS. 13(a) to 13(e) are sectional views showing a step of manufacturing the connecting (short-circuiting) portion between a gate line and a source line in a portion taken along a line of E—E shown in FIG. 12, and a display area end portion. Since reference numerals of the drawing are similar to those of the embodiment 1, explanation thereof is omitted.

Figure 13A:
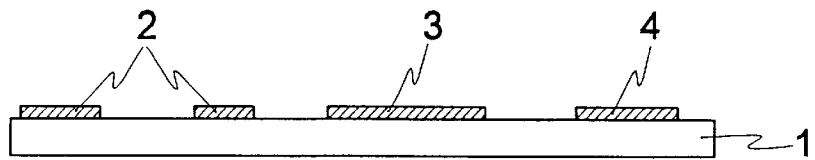
FIGS. 13(a) to 13(e) are sectional views illustrating manufacturing steps for a TFT array substrate provided in a liquid crystal display according to Embodiment 8 of the present invention.
Figure 13B:
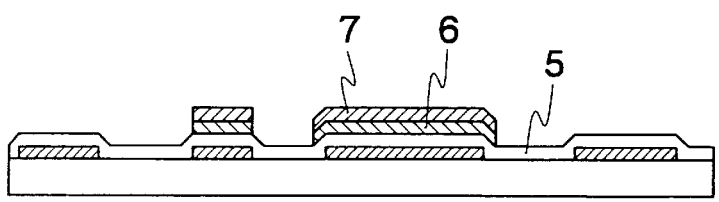
Figure 13C:
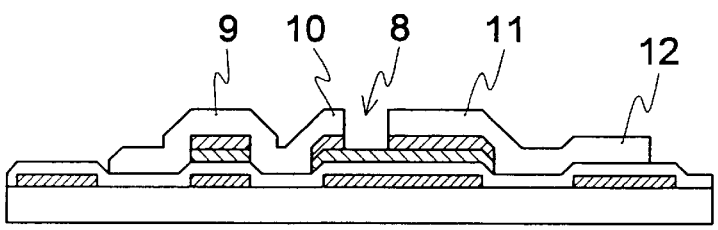

A manufacturing method will now be described. By a method similar to that of the embodiment 1, a gate line 2, a gate electrode 3 and a storage capacitance common line 4 are formed as shown in FIG. 13(a), and a gate insulating film 5, a semiconductor layer 6 and a contact layer 7 are formed as shown in FIG. 13(b). As shown in FIG. 13(c), a source line 9, a source electrode 10, a drain electrode 11, and a storage capacitance electrode 12 which is formed by extending the drain electrode 11 are formed. Then, the contact layer 7 including a recess 8 is formed.

Figure 13D:
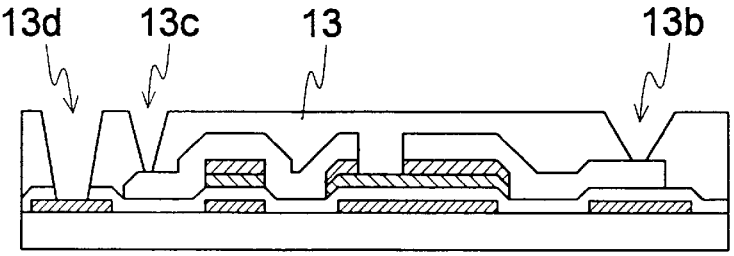

As shown in FIG. 13(d), an interlayer insulating film 13 of thick film is formed. Then, contact holes 13b, 13c and 13d are formed in an interlayer insulating film 13 by etching by using a resist formed through a photolithography process. In this process, contact holes 13a, 13b, 13c and 13d are desirably formed by taper etching. Further, a photosensitive material can be employed as an interlayer insulating film 13 of thick film. At this moment, a resist is not necessary.

The contact hole 13d on the gate line 2 is desirably provided by etching the gate insulating film 5 and the interlayer insulating film 13 on the gate line 2 continuously. When a photosensitive organic insulating film is used as an interlayer insulating film 13 after a contact hole is formed in the interlayer insulating film 13, the gate insulating film 5 can be etched by using the interlayer insulating film 13 as a mask. When an interlayer insulating film 13 which is not photosensitive is used, the gate insulating film 5 can be etched by using a resist used to form a contact hole in an interlayer insulating film 13 as a mask, or the gate insulating film 13 after the resist is removed as a mask. When a gate insulating film 5 is formed by using silicon nitride or the like, a contact hole is formed in the interlayer insulating film 13, by etching in such a manner that the wall of contact hole is tapered. Then, a mixed gas chiefly composed of either of $SF_6+O_2$, $CF_4+O_2$, $HCl+O_2$ and $F+O$, or a mixed gas including either of $SF_6$, $CF_4$, HCl and F, or a gas capable of taper etching can be used.

The etching method can be either of a wet etching method and a dry etching method.

Figure 13E:
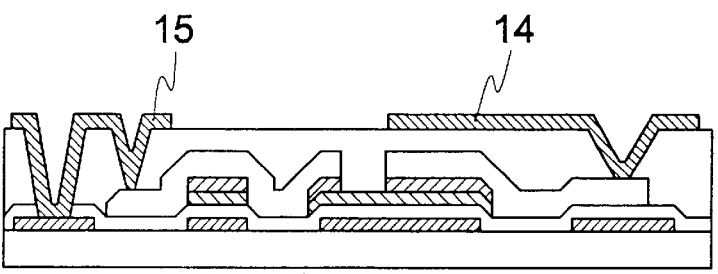

Finally, as shown in FIG. 13(e), a connecting line 15 for electrically connecting a gate line 2 with a source line 3 through a pixel electrode 14, and a contact hole 13c, and a contact hole 13d. The pixel electrode 14 is electrically connected with a drain electrode 11 which is integrally formed with a storage capacitance electrode 12, and a storage capacitance electrode 12 through a contact hole 13a.

A short-circuiting portion between a gate line 2 and a source line 9 of preventing the electrostatic breakdown of a TFT and a TFT array substrate having a configuration where a pixel electrode 14 has a superposed portion between a source line 9 and a gate line 2 through an interlayer insulating film 13 of thick film can be formed by five photolithography processes.

A configuration for forming a storage capacitance electrode 12 by extending a drain electrode 11 is applied to a TFT array substrate where a pixel electrode 14 is formed in an upper layer above a source electrode 10 and a drain electrode 11, thus making it possible to inspect a TFT array before the formation of an interlayer insulating film 13.

Embodiment 9

FIGS. 14(a) to 14(e) are sectional views showing steps of manufacturing a TFT array substrate of an AMLCD by embodiment 9. Referring to FIGS. 14(a) to 14(e), reference numeral 16 denotes an insulating film formed in the lower layer of the interlayer insulating film 13. The other reference numerals are similar to those of embodiment 1, explanation thereof is omitted.

When an interlayer insulating film 13 of thick film shown in the embodiments 6, 7 and 8 is made of an organic insulating film or an inorganic insulating film, comparatively lower in density, to be obtained by burning after application by a spin coating method or the like, there is a problem that moisture or the like is absorbed by an interlayer insulating film 13 and is diffused into the interlayer insulating film. At this moment, there is a problem that particularly when a TFT construction is of a channel etch type as shown in FIG. 10, and FIGS. 13(a) to 13(e), moisture or the like absorbed into the interlayer insulating film 13 reaches a semiconductor layer 6, because the semiconductor layer 6 is in contact with the interlayer insulating film 13 directly at the etched off region 8. Since the part of the contact layer 7 and the transparent conductive film was removed and then the surface of the semiconductor layer was exposed. Thus, the semiconductor layer is in contact with the interlayer insulating film 13. Furthermore, there is a problem that off current becomes increased due to influence of a surface state formed by the boundary between an interlayer insulating film 13 and a semiconductor layer 6 and that a threshold value is changed.

In this embodiment, as shown in FIG. 14, a film of silicon nitride or silicon oxide or an insulating film 16 such as inorganic insulating film, organic insulating film or the like higher in density than an interlayer insulating film 13 is formed by a plasma CVD method or the like before forming the interlayer insulating film 13, in order to prevent such an inconvenience that moisture or the like, which is absorbed by the interlayer insulating film 13, reaches to the semiconductor layer 6.

Figure 14A:
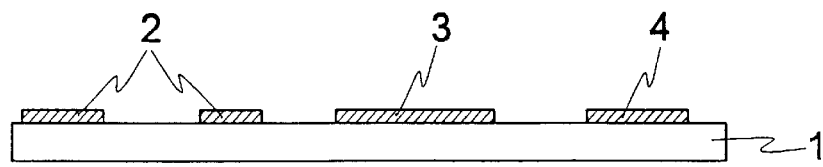
FIGS. 14(a) to 14(f) are sectional views illustrating manufacturing steps for a TFT array substrate provided in a liquid crystal display according to Embodiment 9 of the present invention.
Figure 14B:
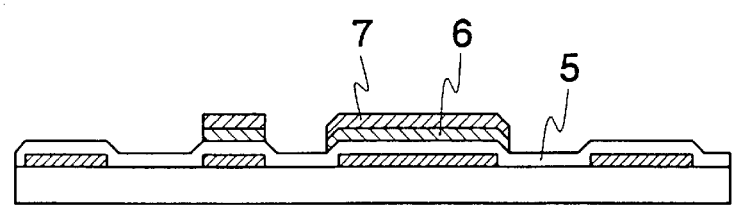
Figure 14C:
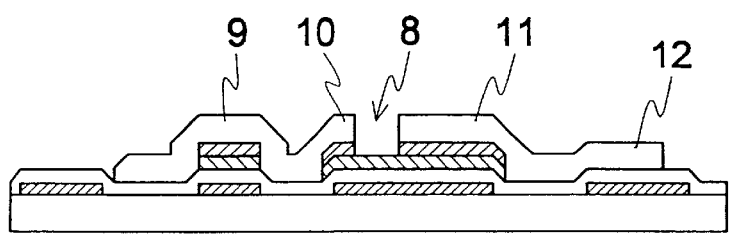
Figure 14D:
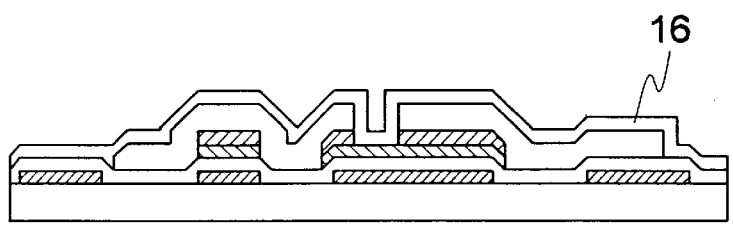
Figure 14E:
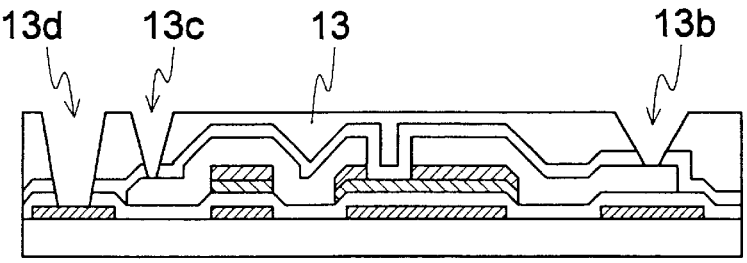
Figure 14F:
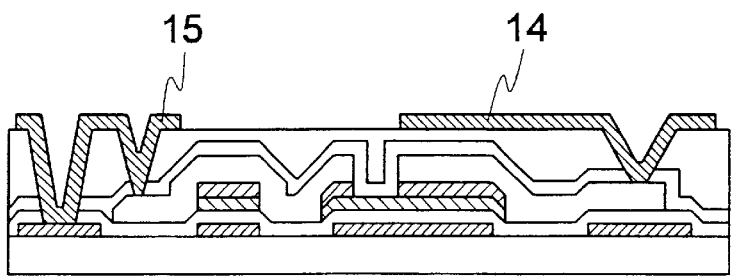
Figure 15A:
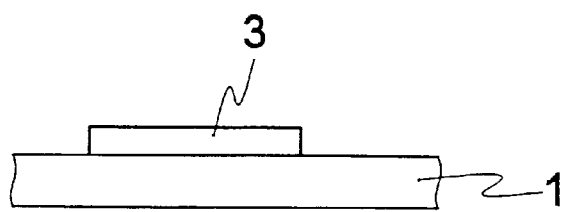
FIGS. 15(a) to 15(d) are sectional views illustrating manufacturing steps for a TFT array substrate provided in a liquid crystal display according to Embodiment 11 of the present invention.
Figure 15B:
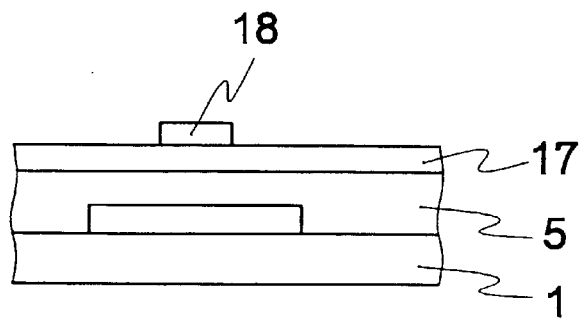
Figure 15C:
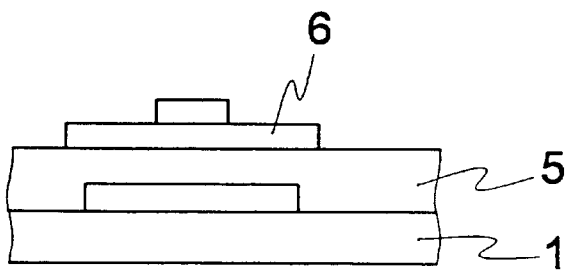
Figure 15D:
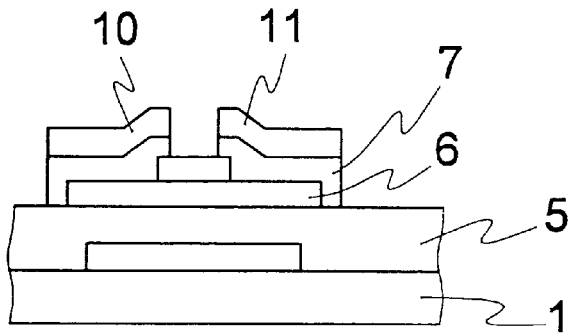

A method of manufacturing a TFT array substrate of this embodiment will now be described. By a method similar to that of the embodiment 1, a gate line 2, a gate electrode 3 and a common line 4 are formed as shown in FIG. 14(a), and a gate insulating film 5, a semiconductor layer 6 and a contact layer 7 are formed as shown in FIG. 14(b). A source line 9, a source electrode 10, a drain electrode 11, and a storage capacitance electrode 12 formed by extending a drain electrode are formed as shown in FIG. 14(c). Then, an etched off region 8 of a contact layer 7 is formed. As shown in FIG.

14(*d*), a film of a silicon nitride or a silicon oxide is on entire surface formed or an insulating film 16 such as inorganic insulating film, organic insulating film or the like higher in density than the interlayer insulating film 13 is formed on entire surface. As shown in FIG. 14(*e*), the insulating film is etched by using a resist formed by a photolithography process after an interlayer insulating film 13 of thick film has been formed, in order to form contact holes 13*b*, 13*c* and 13*d* in the interlayer insulating film 13 and the insulating film 16. Finally, as shown in FIG. 14(*f*), a connecting line 15 for electrically connecting a gate line 2 with a source line 3 through a pixel electrode 14, and a contact hole 13*c* and a contact hole 13*d*. The pixel electrode 14 is electrically connected with a storage capacitance electrode 12, and a drain electrode 11 integrally formed with a storage capacitance electrode 12 through a contact hole 13*b*.

When a TFT array is formed in a structure in which a pixel electrode 14 in the layer upper than a source electrode 10 and a drain electrode 11, and an interlayer insulating film 13 is composed of an organic insulating film or an inorganic insulating film, comparatively lower in density, to be obtained by burning after application by a spin coating method or the like, a configuration shown in this embodiment can be applied.

According to this embodiment, an effect similar to that of the embodiment 8 can be obtained. Moisture or the like absorbed into the interlayer insulating film 13 can be prevented from reaching a semiconductor layer 6.

Embodiment 10

A gate line 2 and a gate electrode 3 shown in the embodiment can be constructed of a conductive material such as Al, Ta or the like on which an anodic oxidation is conducted. At a time when providing a contact hole 13*d* into an interlayer insulating film 13 shown in, for example, FIG. 2(*d*), a perforating a contact hole into the anodic oxidation film (a film subjected by anodic oxidation) is continuously conducted after the perforating contact holes into the interlayer insulating film 13 and a gate insulating film 5. After the formation of a gate line 2, an anodic oxidation can be conducted after forming a mask such as a resist or the like in the position of a contact hole 13*d* on a gate line 2 which becomes a portion connecting with a source line 9. In this case, a continuous perforating step for three layers, i.e., an interlayer insulating film 13, a gate insulating film 5 and an anodic oxidation film, in the formation of a contact hole 13*d* becomes unnecessary.

According to this embodiment, an anodic oxidizing film is provided in the surface layer of a gate line 2 and a gate electrode 3, so that an effect similar to that of embodiment 1 can be obtained and a generation of hillock is prevented.

Embodiment 11

In the aforementioned embodiment, an AMLCD in which a channel etch type TFT is mounted is shown. But as shown in FIGS. 15(*a*) to 15(*e*), an etching stopper type TFT can be used.

FIGS. 15(*a*) to 15(*e*) are sectional views showing steps of manufacturing a channel passivation type TFT portion of a TFT array substrate of an embodiment 11. Referring to FIGS. 15(*a*) to 15(*e*), reference numeral 17 denotes a semiconductor film for constituting a semiconductor layer 6, and reference numeral 18 denotes an etching stopper. Since the other reference numerals are similar to those of the embodiment 1, explanation thereof will be omitted. The configuration except for the TFT is similar to that of the aforementioned embodiment.

A method of manufacturing an etching stopper type TFT will now be described. As shown in FIG. 15(*a*), a conductive material is deposited. Then, the deposited conductive film is patterned by using a resist formed by a photolithography process to form a gate electrode 3. As shown in FIG. 15(*b*), a gate insulating film 5, a semiconductor film 17, a silicon nitride film and so on are made continuously. Then, a silicon nitride film is patterned by using a resist formed by a photolithography process, in order to form an etching stopper 18. As shown in FIG. 15(*c*), a semiconductor film 17 is patterned by using a resist formed by a photolithography process to form a semiconductor layer 6. As shown in FIG. 15(*d*), an n$^+$-type semiconductor film in which impurities such as P or the like and a conductive material film are doped are deposited continuously. Then, the n$^+$-type semiconductor film and the conductive material film are patterned by using a resist formed by a photolithography process, in order to form a contact layer 7, a source electrode 10 and a drain electrode 11.

The method for forming the contact layer by deposition 7 has explained. The contact layer can be formed by ion implantation as explained below. After forming an etching stopper 18 (FIG. 15(*b*)), using as a mask the etching stopper or a resist on which the etching stopper is formed, impurity ions such as P or the like is implanted into the entire face. Then, a semiconductor film in which into at least a portion which is to be a contact portion an impurity ion is partially implanted is patterned by using a resist formed by a photolithography process, in order to form a semiconductor layer having a layer in which impurity ions are implanted into the surface. Then, a conductive material is deposited and is patterned by using a resist formed by a photolithography process, in order to form a source electrode 10 and a drain electrode 11. A channel passivation type TFT is formed by the above described step.

An interlayer insulating film having a contact hole, a pixel electrode, and a connecting line for short-circuiting a gate line and a source line are formed by methods similar to those of other embodiments.

According to this embodiment, even in a TFT array substrate on which a channel passivation type TFT is provided, an AMLCD including a configuration for short-circuiting between a gate line and a source line for preventing the TFT electrostatic breakdown can be manufactured by photolithography steps which are fewer in number by one than before.

Embodiment 12

In the embodiment 11, a semiconductor film 17 is patterned and a semiconductor layer 6 is formed. Then, an n$^+$-type semiconductor and a conductive material in which impurities such as P or the like are doped are deposited continuously. A resist is formed again and the deposited films are patterned to form a contact layer 7, a source electrode 10 and a drain electrode 11. But as shown in FIG. 16, after forming an etching stopper (FIG. 16(*b*)), an n$^+$-type semiconductor film 19 and a conductive material film 20 in which impurities such as P or the like are doped are deposited continuously without patterning a semiconductor film 17. A conductive material film 20, an n$^+$-type semiconductor film 19 and a semiconductor film 17 can be patterned simultaneously or continuously by using a resist formed by a photolithography process, in order to form a semiconductor layer 6, a contact layer 7 and a source electrode 10, a drain electrode 11. A contact layer can be formed by n$^+$-type semiconductor as a material.

Figure 16A:
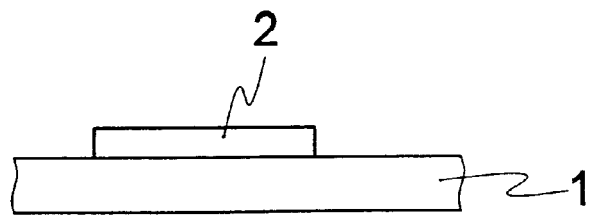
FIGS. 16(a) to 16(d) are sectional views illustrating manufacturing steps for a TFT array substrate provided in a liquid crystal display according to Embodiment 12 of the present invention.
Figure 16B:
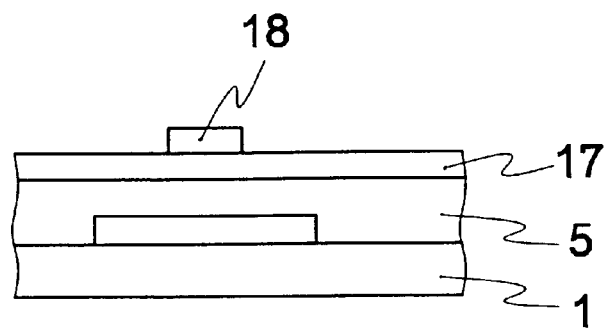
Figure 16C:
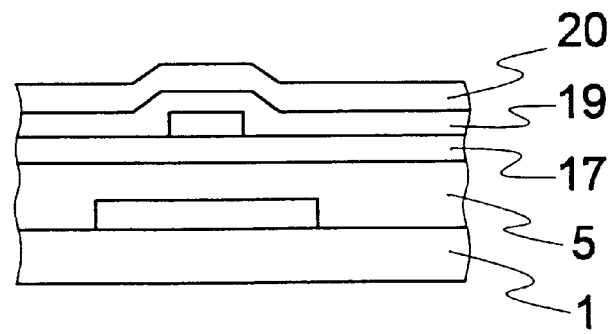
Figure 16D:
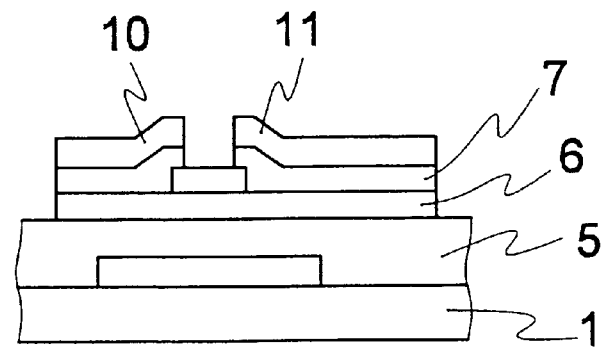

In another case, after the etching stopper 18 is formed (FIG. 16(b)), by using as a mark an etching stopper or a resist on which an etching stopper is formed impurity ions such as P or the like are implanted into the entire face to form a contact portion partially. Then, a conductive film 20 is deposited. A semiconductor film and a conductive film into which impurity ions are implanted into surface layer by using a resist formed by a photolithography process are patterned simultaneously or continuously, in order to form a semiconductor layer 6 having a layer in which impurity ions are implanted partially, and a source electrode 10, a drain electrode 11. By the aforementioned steps, a TFT of a channel passivation type can be formed.

Embodiment 13

In the aforementioned embodiment, an inverted staggered type as TFT construction is shown, but a staggered type TFT can be used as shown in FIG. 17(a) to 17(e).

FIGS. 17(a) to 17(e) are sectional views showing steps of manufacturing a TFT array substrate on which a staggered type TFT is mounted of the embodiment 13. Since reference numerals shown in FIGS. 17(a) to 17(e) are similar to those of the embodiment 1, explanation thereof is omitted.

Figure 17A:
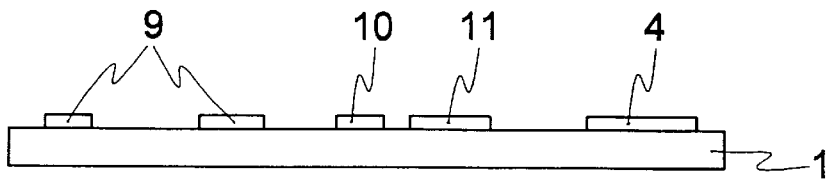
FIGS. 17(a) to 17(e) are sectional views illustrating manufacturing steps for a TFT array substrate provided in a liquid crystal display according to Embodiment 13 of the present invention.
Figure 17B:
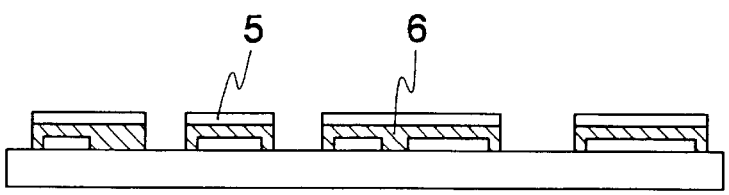
Figure 17C:
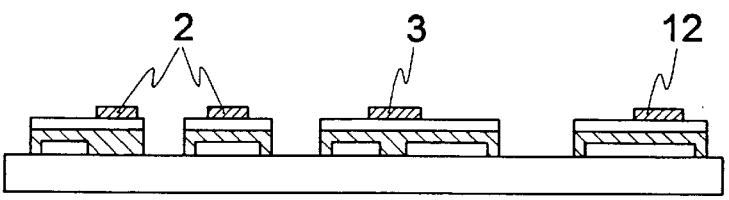

A manufacturing method will now be described. As shown in FIG. 17(a), after a conductive material is deposited on an insulating substrate 1, a a deposited film is patterned by using a resist formed by a photolithography method, in order to form a source line 9, a source electrode 10, a drain electrode 11 and a storage capacitance electrode 6. As shown in FIG. 17(b), after a semiconductor film, a silicon nitride and so on are deposited continuously, the deposited films are patterned in island like pattern by using resists formed by a photolithography process, in order to form a semiconductor layer 6 and a gate insulating film 5. As shown in FIG. 17(c), after a conductive material is deposited, the deposited conductive film is patterned by using a resist formed by a photolithography process, in order to form a gate line 2, a gate 3 and a storage capacitance electrode 12.

Figure 17D:
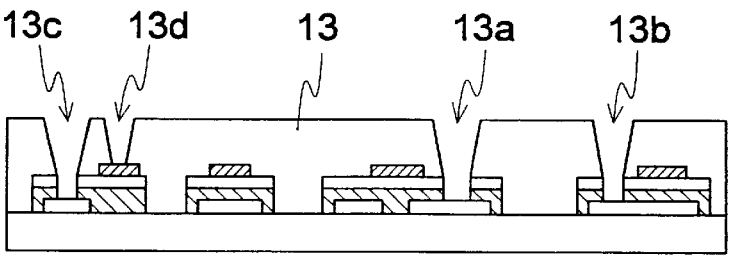
Figure 17E:
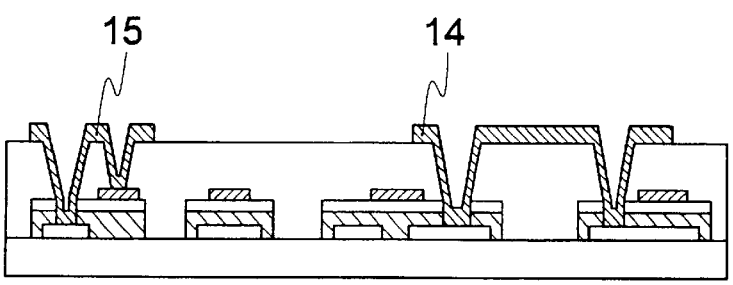

As shown in FIG. 17(d), an interlayer insulating film 13 is formed and patterned by using a photolithography process, in order to form an interlayer insulating film 13 and a gate insulating film 5, and contact holes 13a, 13b, 13c and 13d in a semiconductor layer 6. At a portion to which a contact hole 13c is to be provided gate insulating film 5 and semiconductor film 6 can be removed by etching beforehand as shown in FIG. 17(c). Finally as shown in FIG. 17(e), after a transparent conductive film is deposited, and patterned by a photolithography process, in order to form a pixel electrode 14. At this moment, in the display area end portion, a connecting line 15 is formed of a transparent conductive film for electrically connecting a gate line 2 and a source line 3 through a contact hole 13c and a contact hole 13d. A pixel electrode 14 is electrically connected with a drain electrode 11 through a contact hole 13a, and with a common line 4 through a contact hole 13b.

According to this embodiment, even in a TFT array substrate on which a staggered type TFT is mounted, an AMLCD including construction for short-circuiting a gate line and a source line for preventing electrostatic breakdown in the TFT can be manufactured by photolithography steps which are fewer in number by one than before.

Embodiment 14

In the aforementioned embodiments (1 to 13), a transparent film such as ITO or the like as a pixelelectrode 14 is shown, but an effect similar to that of the embodiment can be obtained by using an opaque conductive material composed of a single-layer film or a multi-layer film laminated with these single layer films of either of Al, Cr, Ta or the like or an alloy chiefly composed of the above-mentioned metals as a pixel electrode. In this case, TFT array substrate can be used as a reflective type liquid crystal display.

According to the invention, in an AMLCD having a configuration where a gate line and a source line are short-circuited for preventing the electrostatic breakdown in a TFT, a gate line and a source line are connected by a contact hole formed simultaneously with another contact hole for connecting a pixel electrode with a drain electrode, and a connecting line 15 formed simultaneously with a pixel electrode. Therefore, a step of forming a contact hole for connecting between a gate line and a source line which were required conventionally becomes unnecessary. A frequency of photolithography processes in manufacturing a TFT array substrate can be reduced by one as compared with the conventional process. The manufacturing step can be simplified, in order to reduce the manufacturing cost and to improve throughput. This effect can be obtained even in a liquid crystal display in which a TFT having either in which one of configurations of a channel etch type TFT, a channel passivation type TFT, a staggered type TFT and an inverted stagger type TFT is mounted.

A storage capacitance electrode becomes unnecessary, preventing inferior contact with a source line to be formed in a same layer as that of a storage capacitance electrode.

Since the number of forming contact holes into an interlayer insulating film can be reduced, probability of causing inferior connection in the contact hole can be reduced and also, and a TFT array can be inspected before forming a pixel electrode.

Also, the forming a storage capacitance electrode becomes unnecessary.

Further, an aperture ratio can be improved by superposing a pixel electrode on a gate line and a source line.

It should be understood that the apparatus and methods which have been shown and described herein are illustrative of the invention and are not intended to be limited thereof. Clearly, those skilled in the art may conceive of variations or modifications to the invention. However, any such variations or modifications which falls within the purview of this description are intended to be included therein as well. The scope of the invention is limited only by the claims appended hereto.

What is claimed is:

1. A TFT array substrate comprising:

an insulating substrate, a gate electrode formed on said insulating substrate, a gate electrode line formed on said insulating substrate, an insulating film formed on said gate electrode, said gate electrode line and said insulating substrate except for whole of outer surface of said gate electrode and whole of outer surface of said gate electrode line, a semiconductor layer formed on said insulating film, a contact layer formed on said semiconductor layer, a source electrode connected to said contact layer, a drain electrode which is connected to said contact layer, said contact layer being divided into two portions, one of said two portions corresponding to said source electrode and the other one of said two portions corresponding to said drain electrode, a source electrode line connected to said source electrode, an interlayer insulating film formed on said gate electrode, said gate electrode line, said source electrode, said source electrode line and said drain electrode, a pixel electrode which is formed on said interlayer insulating film and is made of transparent conductive film and is connected electrically to said drain electrode through a first contact hole provided in said interlayer insulating film, and a connecting line which is made of a same material that of said pixel electrode and connects electrically between said gate electrode line and said source electrode line through a second contact hole provided in said insulating film and a third contact hole provided in said interlayer insulating film.

2. The TFT array substrate of claim 1, wherein said TFT array substrate further includes a common line for storage capacitance which is formed through said gate insulating film under a storage capacitance electrode at a same time when said gate electrode and said gate electrode line are formed, and said storage capacitance electrode which is formed over said common line for storage capacitance, and is formed at a same time when said source electrode, said source electrode line and said gate electrode line are formed, and is connected electrically to said pixel electrode through a contact hole formed in said interlayer insulating film, so that said TFT array substrate includes a storage capacitance between said common line for storage capacitance and said storage capacitance electrode.

3. TFT array substrate of claim 2, wherein said storage capacitance is provided by said storage capacitance electrode and said gate electrode line.

4. The TFT array substrate of claim 2, wherein said storage capacitance is provided by said gate electrode and said pixel electrode.

5. The TFT array substrate of claim 1, wherein said TFT array substrate further includes a common line for storage capacitance formed at a same time when said gate electrode and said gate electrode line are formed, so that said TFT array substrate includes a storage capacitance between said common line for storage capacitance and said pixel electrode.

6. The TFT array substrate of claim 1, wherein said interlayer insulating film comprises a thick film.

7. The TFT array substrate of claim 1, wherein said interlayer insulating film comprises a multi-layer film including a high density film as a lower layer of said multi-layer film.

8. The TFT array substrate of claim 6, wherein said high density film is composed of silicon nitride.

9. The TFT array substrate of claim 1, wherein said pixel electrode superposes on at least one of said gate electrode line and said source electrode line.

10. The method of manufacturing a TFT array substrate of claim 9, wherein at least one contact hole of said first contact hole, said second contact hole and said third contact hole, in multi-layer film including at least said interlayer insulating film as a top layer of said multi-layer film is provided by steps of:

(a) providing said one contact hole into said interlayer insulating film, and (b) etching a lower film of said multi-layer film by using said interlayer insulating film as a mask.

11. The TFT array substrate of claim 1, wherein an etching stopper is provided on said semiconductor layer.

12. The method of manufacturing a TFT array substrate of claim 11, wherein an etching stopper is provided on said semiconductor layer and in step (b) said etching stopper is provided after forming said semiconductor layer on said gate electrode and said gate electrode line.

13. A method of manufacturing a TFT array substrate comprising an insulating substrate, a gate electrode formed on said insulating substrate, a gate electrode line formed on said insulating substrate, an insulating film formed on said gate electrode, said gate electrode line and said insulating substrate except for whole of outer surface of said gate electrode and whole of outer surface of said gate electrode line, a semiconductor layer formed on said insulating film, a contact layer formed on said semiconductor layer, a source electrode connected to said contact layer, a drain electrode which is connected to said contact layer, said contact layer being divided into two portions, one of said two portions corresponding to said source electrode and the other one of said two portions corresponding to said drain electrode, a source electrode line connected to said source electrode, an interlayer insulating film formed on said gate electrode, said gate electrode line, said source electrode, said source electrode line and said drain electrode, a pixel electrode which is formed on said interlayer insulating film and is made of transparent conductive film and is connected electrically to said drain electrode through a first contact hole provided in said interlayer insulating film, and a connecting line which is made of a same material that of said pixel electrode and connects electrically between said gate electrode line and said source electrode line through a second contact hole provided in said insulating film and a third contact hole provided in said semiconductor layer on said source electrode, said insulating film and said interlayer insulating film, said method comprising steps of:

(a) forming said gate electrode and said gate electrode line on said insulating substrate, (b) depositing said insulating film on said gate electrode, said gate electrode line and said insulating substrate except for whole of outer surface of said gate electrode and whole of outer surface of said gate electrode line, (c) forming said semiconductor layer over said gate electrode through said insulating film and forming said contact layer on said semiconductor layer, (d) forming said source electrode and said drain electrode on said contact layer, and forming said source electrode line and etching said contact layer by using said source electrode and said drain electrode as masks, (e) depositing said interlayer insulating film on said source electrode, said source electrode line and said drain electrode, (f) providing simultaneously two of said first contact hole in said insulating film on said gate electrode and in said interlayer insulating film, said second contact hole in said interlayer insulating film on said source electrode line, and said third contact hole in said interlayer insulating film on said drain electrode, and (g) forming simultaneously said pixel electrode and said connecting line.

* * * * *

UNITED STATES PATENT AND TRADEMARK OFFICE
CERTIFICATE OF CORRECTION

PATENT NO.     : 6,310,669 B1
DATED          : October 30, 2001
INVENTOR(S)    : Kobayashi et al.

It is certified that error appears in the above-identified patent and that said Letters Patent is hereby corrected as shown below:

Title page, Item [54], Column 1,
The title of the Invention should read:
-- [54] TFT ARRAY SUBSTRATE AND METHOD OF MANUFACTURING THE SAME AND METHOD OF MANUFACTURING LIQUID CRYSTAL DISPLAY USING THE SAME --

Signed and Sealed this

Twelfth Day of March, 2002

*Attest:*

*Attesting Officer*

JAMES E. ROGAN
*Director of the United States Patent and Trademark Office*